United States Patent
Niwa et al.

(10) Patent No.: US 9,897,468 B2
(45) Date of Patent: Feb. 20, 2018

(54) POSITION DETECTION DEVICE

(71) Applicant: Panasonic Intellectual Property Management Co., Ltd., Osaka (JP)

(72) Inventors: Masahisa Niwa, Osaka (JP); Kunitaka Okada, Osaka (JP); Kazuma Haraguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/121,634

(22) PCT Filed: Feb. 23, 2015

(86) PCT No.: PCT/JP2015/000833
§ 371 (c)(1),
(2) Date: Aug. 25, 2016

(87) PCT Pub. No.: WO2015/129229
PCT Pub. Date: Sep. 3, 2015

(65) Prior Publication Data
US 2016/0363463 A1 Dec. 15, 2016

(30) Foreign Application Priority Data

Feb. 26, 2014 (JP) .................................. 2014-035589
Dec. 19, 2014 (JP) .................................. 2014-257745
Dec. 19, 2014 (JP) .................................. 2014-257746

(51) Int. Cl.
*G01D 5/22* (2006.01)
*G01D 3/08* (2006.01)
(Continued)

(52) U.S. Cl.
CPC ............... *G01D 5/22* (2013.01); *G01B 7/003* (2013.01); *G01D 3/08* (2013.01); *G01D 5/2053* (2013.01)

(58) Field of Classification Search
CPC .............................. G01D 5/22; G01D 5/2053
(Continued)

(56) References Cited

U.S. PATENT DOCUMENTS

| 4,783,626 A | 11/1988 | Shimizu | |
|---|---|---|---|
| 2015/0198561 A1* | 7/2015 | Momose | G01V 3/104 324/207.17 |

FOREIGN PATENT DOCUMENTS

| JP | S58-136718 A | 8/1983 |
|---|---|---|
| JP | 58-136718 U | 9/1983 |

(Continued)

OTHER PUBLICATIONS

International Search Report issued in Application No. PCT/JP2015/000833 dated Apr. 7, 2015, with English translation.

*Primary Examiner* — Christopher Mahoney
(74) *Attorney, Agent, or Firm* — McDermott Will & Emery LLP

(57) ABSTRACT

A processor of a position detection device intermittently performs an acquisition process during a measurement period to acquire a detection signal induced in a detection coil depending on the position of an object by driving an excitation coil. The processor configured to monitor whether or not the processor is executing the acquisition process without driving the excitation coil during a monitoring period set before the measurement period of the processor, and the processor is configured to execute a predetermined process when the processor is executing the acquisition process.

18 Claims, 15 Drawing Sheets

(51) Int. Cl.
*G01D 5/20* (2006.01)
*G01B 7/00* (2006.01)

(58) Field of Classification Search
USPC .................................................. 324/207.17
See application file for complete search history.

(56) References Cited

FOREIGN PATENT DOCUMENTS

| | | |
|---|---|---|
| JP | S62-215802 A | 9/1987 |
| JP | 2005-265463 A | 9/2005 |
| JP | 2010-164431 A | 7/2010 |

\* cited by examiner

POSITION DETECTION DEVICE

RELATED APPLICATIONS

This application is the U.S. National Phase under 35 U.S.C. § 371 of International Application No. PCT/JP2015/000833, filed on Feb. 23, 2015, which in turn claims the benefit of Japanese Application No. 2014-035589, filed on Feb. 26, 2014, Japanese Application No. 2014-257745, filed Dec. 19, 2014 and Japanese Application No. 2014-257746, filed Dec. 19, 2014, the disclosures of which are incorporated by reference herein.

TECHNICAL FIELD

The present invention generally relates to position detection devices, and specifically relates to a position detection device including a plurality of detectors.

BACKGROUND ART

An electromagnetic induction-type displacement sensor (position detection device) has been provided which includes two detection circuits (detectors) so that even when a fault occurs on one of the detectors, displacement of an object is detectable by the other of the detectors. Such a position detection device has been disclosed in, for example, Document 1 (JP 2005-265463 A). The position detection device includes two detectors each including a coil drive unit, two drive coils (excitation coils) each connected to the coil drive unit, and two detection coils each connected to the detector. The position detection device further includes an electromagnetic coupling member displaceable relatively to the excitation coils and the detection coils. The coil drive units include oscillation circuits each connected to a corresponding one of the excitation coils and timers each configured to output an oscillation inhibiting signal to the oscillation circuit of the other of the coil drive units.

In this position detection device, while one of the coil drive units drives the excitation coil, drive of the other of the excitation coils is interrupted by the oscillation inhibiting signal of the timer of the one coil drive unit, thereby allowing the two detectors to detect the displacement of the electromagnetic coupling member in a time sharing manner.

However, the conventional example described above does not consider a circumstance in which drive periods of the excitation coils overlap each other on activation of the detectors. Therefore, in the conventional example described above, when the drive periods of the excitation coils overlap each other on activation of the detectors, for example, detection processes by the detectors may be simultaneously performed, which may lead to mutual magnetic interference.

SUMMARY OF INVENTION

In view of the foregoing, it is an object of the present invention to provide a position detection device capable of reducing the possibility that drive periods of excitation coils overlap each other on activation of detectors.

A position detection device according to an aspect of the present invention includes a first detector and a second detector. The first detector includes a first excitation coil, a first detection coil, and a first processor. The second detector includes a second excitation coil, a second detection coil, and a second processor. The first excitation coil is magnetically coupled to the first detection coil and the second detection coil. The second excitation coil is magnetically coupled to the first detection coil and the second detection coil. The first processor is configured to intermittently execute a first acquisition process during a measurement period of the first processor to drive the first excitation coil and to acquire a first detection signal induced in the first detection coil depending on a position of an object by driving the first excitation coil. The second processor is configured to intermittently execute a second acquisition process during a measurement period of the second processor to drive the second excitation coil and to acquire a second detection signal induced in the second detection coil depending on a position of the object by driving the second excitation coil. The second processor is configured to monitor whether or not the first processor is executing the first acquisition process without driving the second excitation coil during a monitoring period set before the measurement period of the second processor, and the second processor is configured to execute a predetermined process when the first processor is executing the first acquisition process.

DESCRIPTION OF EMBODIMENTS

First Embodiment

Figure 1:
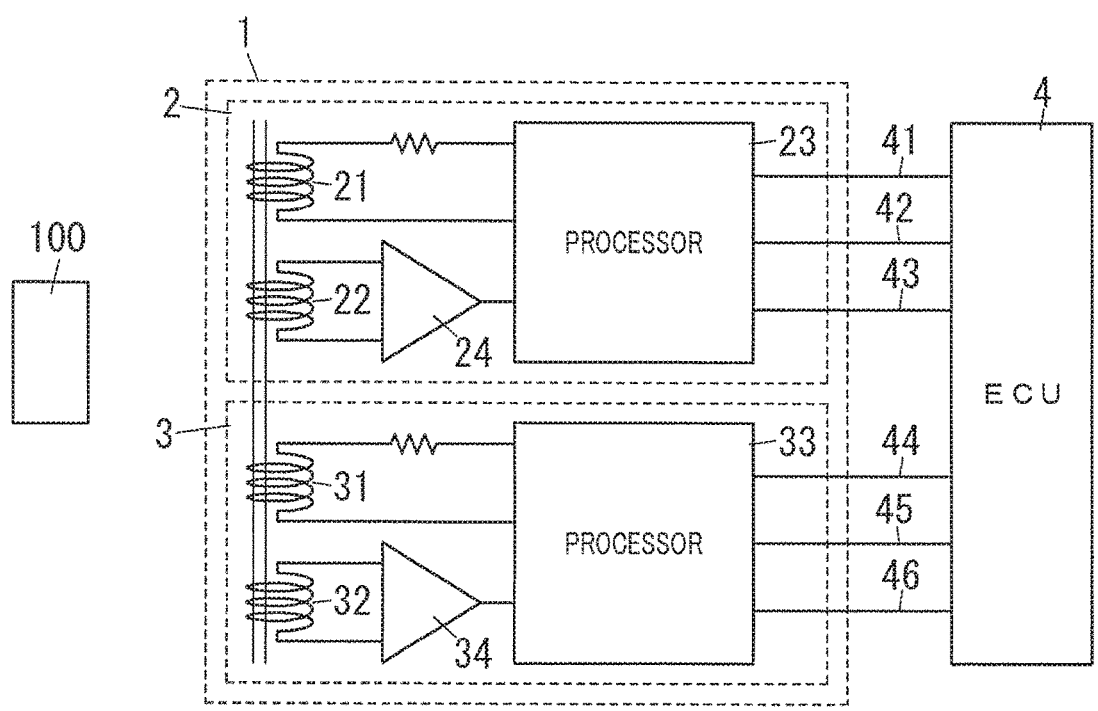
FIG. 1 is a view schematically illustrating the configuration of an example of a position detection device according to a first embodiment.

As illustrated in FIG. 1, a position detection device according to a first embodiment of the present invention includes a detector 2 (here, first detector) and a detector 3 (here, second detector). The detector 2 includes a (first) excitation coil 21, a (first) detection coil 22, and a (first) processor 23. The detector 3 includes a (second) excitation coil 31, a (second) detection coil 32, and a (second) processor 33. The excitation coil 21 is magnetically coupled to the detection coil 22 and the detection coil 32. The excitation coil 31 is magnetically coupled to the detection coil 22 and the detection coil 32.

The processor 23 is configured to intermittently execute a (first) acquisition process during a measurement period of the processor 23. The (first) acquisition process is a process of driving the excitation coil 21 and acquiring a (first) detection signal Y1 (see FIG. 2) induced in the detection coil 22 depending on the position of an object 100 by the driving the excitation coil 21. The processor 33 is configured to intermittently execute a (second) acquisition process during a measurement period of the processor 33. The (second) acquisition process is a process of driving the excitation coil 31 and acquiring a (second) detection signal Y2 (see FIG. 2) induced in the detection coil 32 depending on the position of the object 100 by the driving the excitation coil 31.

The processor 33 is configured to monitor whether or not the processor 23 is executing the acquisition process without driving the excitation coil 31 during a monitoring period set before the measurement period of the processor 33, and the processor 33 is configured to execute a predetermined process when the processor 23 is executing the acquisition process.

The position detection device 1 according to the first embodiment of the present invention will be described in detail below. Note that the following configurations described below are mere examples of the present invention. The present invention is not limited to the following embodiments. Even in configurations other than those illustrated in the embodiments, various modifications may be made depending on design, etc., without departing from the technical idea of the present invention.

<Basic Configuration>

First, a basic configuration of the position detection device 1 of the present embodiment will be described. As illustrated in FIG. 1, the position detection device 1 of the present embodiment includes the detector 2 and the detector 3 each configured to detect the position of the object 100. In the position detection device 1 of the present embodiment, the object 100 represents a metal piece which moves simultaneously with a brake pedal of a vehicle. Therefore, the position detection device 1 of the present embodiment can be used to detect the pedal travel of a brake by detecting the position of the metal piece. Of course, this example does not intend to limit the application of the position detection device 1. Other applications are possible as long as the position detection device 1 is used to detect the position of the object 100.

The detector 2 includes the excitation coil 21, the detection coil 22, the processor 23, and an amplifier 24. The detector 3 includes the excitation coil 31, the detection coil 32, the processor 33, and the amplifier 34. The detectors 2 and 3 are mounted to, for example, one substrate. The excitation coil 21, the detection coil 22, the excitation coil 31, and the detection coil 32 are arranged in the same area of the substrate. Therefore, the excitation coil 21 is magnetically coupled to the detection coils 22 and 32. The excitation coil 31 is magnetically coupled to the detection coils 22 and 32. Of course, this example does not intend to limit the arrangement of the excitation coils 21 and 31 and the detection coils 22 and 32. Any arrangement is possible as long as the excitation coils 21 and 31 and the detection coils 22 and 32 are magnetically coupled to one another.

In FIG. 1, each of the excitation coil 21, the detection coil 22, the excitation coil 31, and the detection coil 32 includes a single coil but may include a combination of a plurality of coils.

The processor 23 is connected to an Electronic Control Unit (ECU) 4 via electric cables 41 to 43. The processor 33 is connected to the ECU 4 via electric cables 44 to 46. The electric cable 41 (electric cable 44) is a power supply line configured to supply an operating voltage to the processor 23 (processor 33). The electric cable 42 (electric cable 45) is a signal line used for communication between the processor 23 (processor 33) and the ECU 4. Here, a communication system between the processor 23 (processor 33) and the ECU 4 may be either an analog communication system or a digital communication system. When the communication system is digital, bidirectional communication is possible between the processor 23 (processor 33) and the ECU 4 via the electric cable 42 (electric cable 45). The electric cable 43 (electric cable 46) is a grounding conductor used to connect ground of the processor 23 (processor 33) to ground of the ECU 4.

The processor 23 (processor 33) includes, for example, a microcontroller. Of course, the processor 23 (processor 33) does not include the microcontroller but may include hardware such as a Field-Programmable Gate Array (FPGA) and a dedicated Integrated Circuit (IC) other than the microcontroller. The processor 23 (processor 33) may include the amplifier 24 (amplifier 34) which is integrated into a microcontroller or into hardware other than the microcontroller and which will be described later. The processor 23 (processor 33) may include a microcontroller and other hardware in combination.

<Measurement Period>

In the position detection device 1 of the present embodiment, the processor 23 (33) is configured to differently operate during a measurement period for actually detecting the position of the object 100 and during a monitoring period set before the measurement period. First, the operation of the processor 23 (processor 33) during the measurement period will be described.

The processor 23 (processor 33) is configured to intermittently execute a position detecting process of detecting the position of the object 100. In the position detection device 1 of the present embodiment, the position detecting process includes an acquisition process and an arithmetic process. In the acquisition process, the processor 23 (processor 33) gives a drive signal X1 (drive signal X2) having a predetermined frequency and having a predetermined wave number of square waves to the excitation coil 21 (excitation coil 31), thereby driving the excitation coil 21 (excitation coil 31) (see FIG. 2). While in the position detection device 1 of the present embodiment, the processor 23 (processor 33) gives the drive signal X1 (drive signal X2) to drive the excitation coil 21 (excitation coil 31), other configurations may be possible. For example, a resonance capacitor may be connected in parallel with the excitation coil 21 (excitation coil 31) to form a resonance circuit, and the processor 23 (processor 33) may perform positive feedback on the resonance circuit to cause oscillation, thereby driving the excitation coil 21 (excitation coil 31). That is, the processor 23 (processor 33) may be configured to drive the excitation coil 21 (excitation coil 31).

Figure 2:
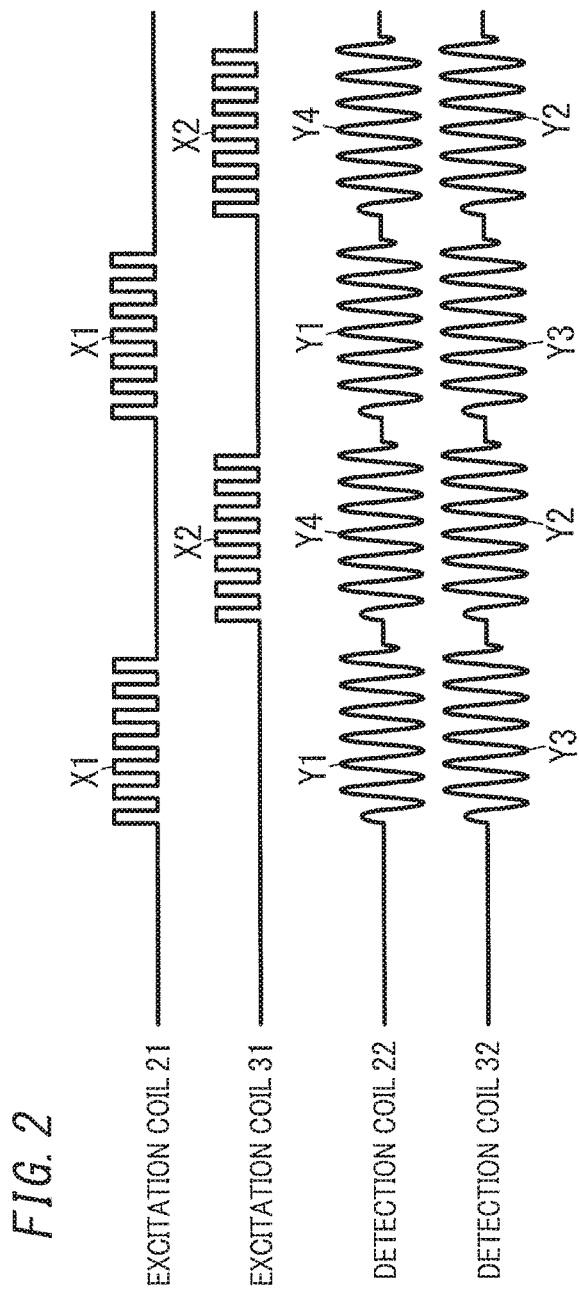
FIG. 2 is a waveform chart of signals in the position detection device according to the first embodiment.

In the acquisition process, the processor 23 (processor 33) acquires a detection signal Y1 (detection signal Y2) induced in the detection coil 22 (detection coil 32) by driving the excitation coil 21 (excitation coil 31) (see FIG. 2). In order to acquire the detection signal Y1 (detection signal Y2), for example, a built-in timer or an Analog to Digital Converter (ADC) is used. In the position detection device 1 of the present embodiment, the detection signal Y1 (detection signal Y2) induced in the detection coil 22 (detection coil 32) is amplified by the amplifier 24 (amplifier 34), and is then input to the processor 23 (processor 33).

Here, the object 100 is magnetically coupled to the excitation coil 21 (excitation coil 31), and an induced current flows through the object 100 when the excitation coil 21 (excitation coil 31) is driven. Since the induced current changes depending on the position of the object 100, the detection signal Y1 (detection signal Y2) also changes depending on the position of the object 100. Therefore, the processor 23 (processor 33) executes an arithmetic process to compute the position of the object 100 based on the acquired detection signal Y1 (detection signal Y2). Note that the acquisition process and the arithmetic process take, for example, 1 ms.

That is, when the detector 2 is assumed to be a first detector, the processor 23 (first processor) is configured to intermittently execute the (first) acquisition process during the measurement period. In the (first) acquisition process, the processor 23 gives the drive signal X1 to the excitation coil 21 (first excitation coil) to drive the excitation coil 21. The processor 23 acquires the detection signal Y1 (first detection signal) induced in the detection coil 22 (first detection coil) depending on the position of the object 100 by driving the excitation coil 21. When the detector 3 is assumed to be a second detector, the processor 33 (second processor) is configured to intermittently execute the (second) acquisition process during a measurement period. In the (second) acquisition process, the processor 33 gives the drive signal X2 to the excitation coil 31 (second excitation coil) to drive the excitation coil 31. The processor 33 acquires the detection signal Y2 (second detection signal) induced in the detection coil 32 (second detection coil) depending on the position of the object 100 by driving the excitation coil 31.

The processor 23 (processor 33) is configured to, in a state where the processor 23 (processor 33) is not executing the acquisition process (hereinafter referred to as a "standby state"), determine a timing to execute the acquisition process, and the processor 23 (processor 33) is configured to execute the acquisition process at the determined timing. For example, it is assumed that the processor 23 of the detector 2 is executing the acquisition process and the processor 33 of the detector 3 is in the standby state. In this case, a detection signal Y3 is induced in the detection coil 32 by driving the excitation coil 21 (see FIG. 2). The processor 33 determines a timing to execute the acquisition process based on the detection signal Y3. Then, the processor 33 executes the acquisition process at the determined timing.

Similarly, it is assumed that the processor 33 of the detector 3 is executing the acquisition process, and the processor 23 of the detector 2 is in the standby state. In this case, a detection signal Y4 is induced in the detection coil 22 by driving the excitation coil 31 (see FIG. 2). The processor 23 determines a timing to execute the acquisition process based on the detection signal Y4. Then, the processor 23 executes the acquisition process at the determined timing.

That is, when the detector 2 is assumed to be a first detector and the detector 3 is assumed to be a second detector, the processes described above will be explained as follows. The processor 23 (first processor) executes the (first) acquisition process such that the time period of the (first) acquisition process is separated from the time period of the (second) acquisition process. More specifically, the processor 23 (first processor) executes the (first) acquisition process at a timing based on the detection signal Y4 (fourth detection signal) induced in the detection coil 22 (first detection coil) by driving the excitation coil 31 (second excitation coil). The processor 33 (second processor) executes the (second) acquisition process such that the time period of the (first) acquisition process is separated from the time period of the (second) acquisition process. More specifically, the processor 33 (second processor) executes the (second) acquisition process at a timing based on the detection signal Y3 (third detection signal) induced in the detection coil 32 (second detection coil) by driving the excitation coil 21 (first excitation coil).

Figure 3:
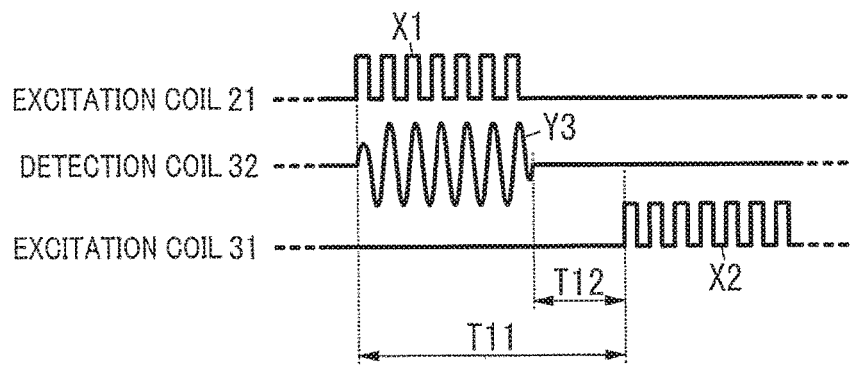
FIG. 3 is a waveform chart of the signals in the position detection device according to the first embodiment in an example of determination of a timing.

As illustrated in FIG. 3, in the position detection device 1 of the present embodiment, the processor 33 determines the timing based on a definite time period T12 having elapsed since the end of the induction of the detection signal Y3. That is, a time period during which the detector 2 is executing the acquisition process is a time period during which the excitation coil 21 is receiving the drive signal X1, and during this time period, the detection signal Y3 is induced in the detection coil 32. Therefore, the processor 33 determines that the acquisition process by the detector 2 has ended at the end of the induction of the detection signal Y3, and executes the acquisition process after the lapse of the definite time period T12. Similarly, the processor 23 determines the timing based on the definite time period T12 having elapsed since the end of the induction of the detection signal Y4.

That is, when the detector 2 is assumed to be a first detector and the detector 3 is assumed to be a second detector, the processes described above will be explained as follows. The processor 33 (second processor) is configured to determine the timing based on the definite time period T12 having elapsed since the end of the induction of the detection signal Y3 (third detection signal). Similarly, the processor 23 (first processor) is configured to determine a timing based on the definite time period T12 having elapsed since the end of the induction of the detection signal Y4 (fourth detection signal). Note that the length of the definite time period T12 of the processor 23 and the length of the definite time period T12 of the processor 33 may be equal to or different from each other.

To realize the processes described above, for example, the detection signal Y3 (detection signal Y4) may be regularly read by an ADC. With this configuration, it is possible to determine that inducing the detection signal Y3 (detection signal Y4) has ended when the level of a read signal is continuously lower than a predetermined threshold. Alternatively, to realize the processes described above, for example, a free running counter may be used, and the counter may be reset by considering switching the detection signal Y3 (detection signal Y4) from a low level to a high level as a trigger. With this configuration, it is possible to determine that inducing the detection signal Y3 (detection signal Y4) has ended when the counter overflows or reaches a predetermined count value.

Here, the time period during which the processor 23 (processor 33) executes the acquisition process is a time period during which the excitation coil 21 (excitation coil 31) is receiving the drive signal X1 (drive signal X2) (see FIG. 3). A time required for the acquisition process is preset. The detection signal Y3 (detection signal Y4) is induced in the detection coil 32 (detection coil 22) when the excitation coil 21 (excitation coil 31) operates. That is, a timing at which the acquisition process ends can be detected by detecting a timing at which the detection signal Y3 (detection signal Y4) is induced in the detection coil 32 (detection coil 22).

Therefore, as illustrated in FIG. 3, the processor 33 (second processor) may be configured to determine the timing based on the definite time period T11 having elapsed since the start of inducing the detection signal Y3 (third detection signal). Similarly, the processor 23 (first processor) may be configured to determine the timing based on the definite time period T11 having elapsed since the start of inducing the detection signal Y4 (fourth detection signal). Note that the length of the definite time period T11 of the processor 23 and the length of the definite time period T11 of the processor 33 may be equal to or different from each other.

Moreover, since the time required for the acquisition process is preset, the wave number of the drive signal X1 (drive signal X2) is also preset. That is, when the wave number of the detection signal Y3 (detection signal Y4) is counted, a timing at which the acquisition process ends can be detected based on the wave number having reached the preset number.

Thus, the processor 33 (second processor) may have the function of counting the wave number of the detection signal Y3 (third detection signal). In this case, the processor 33 may be configured to determine the timing based on the wave number having reached the preset number. Similarly, the processor 23 (first processor) may have the function of counting the wave number of the detection signal Y4 (fourth detection signal). In this case, the processor 23 may be configured to determine the timing based on the wave number having reached the preset number. Note that the function of counting the wave number of the detection signal Y3 (detection signal Y4) can be realized by conventionally known simple hardware or software.

The timing at which the acquisition process ends can also be detected by detecting the amplitude of the detection signal Y3 (detection signal Y4) having decreased below a predetermined threshold. Thus, the processor 33 (second processor) may have the function of measuring the amplitude of the detection signal Y3 (third detection signal). In this case, the processor 33 may be configured to determine the timing based on the amplitude having decreased below the predetermined threshold. Similarly, the processor 23 (first processor) may have the function of measuring the amplitude of the detection signal Y4 (fourth detection signal). In this case, the processor 23 may be configured to determine the timing based on the amplitude having decreased below the predetermined threshold. Note that the function of measuring the amplitude of the detection signal Y3 (detection signal Y4) can be realized by conventionally known simple hardware such as a rectifier circuit, an ADC, etc. or software.

In the position detection device 1 of the present embodiment, the resonance capacitor is connected in parallel with the detection coil 22 (detection coil 32) so as not to detect high-frequency noise. With this configuration, the influence of resonance of the detection coil 22 (detection coil 32) and the resonance capacitor may cause free vibration (reverberation) to remain in the detection signals Y1 to Y4. Therefore, the processor 23 (processor 33) preferably determines that the acquisition process has ended at a time point at which the reverberation in the detection signal is sufficiently reduced. It is optional whether or not the resonance capacitor is used.

A configuration may also be possible in which the processor 23 (processor 33) executing the acquisition process gives an end signal notifying the end of the acquisition process to the excitation coil 21 (excitation coil 31). Inducing the end signal in the detection coil 22 (detection coil 32) allows the processor 23 (processor 33) in the standby state to detect a timing at which the acquisition process ends. Examples of the end signal may include signals including specific bit sequences or having frequencies different from that of the drive signal X1 (drive signal X2).

That is, the processor 23 (first processor) may have the function of giving an end signal notifying the end of the (first) acquisition process to the excitation coil 21 (first excitation coil). The processor 33 (second processor) may be configured to determine the timing based on the end signal having been induced in the detection coil 32 (second detection coil) and having been detected. Similarly, the processor 33 (second processor) may have the function of giving the end signal notifying the end of the (second) acquisition process to the excitation coil 31 (second excitation coil). The processor 23 (first processor) may be configured to determine the timing based on the end signal having been induced in the detection coil 22 (first detection coil) and having been detected.

Figure 5:
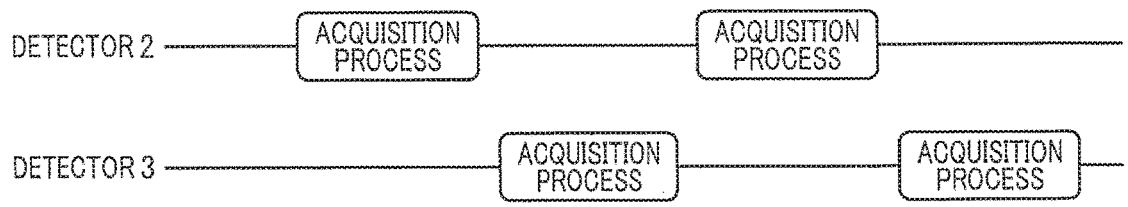
FIG. 5 is a time chart illustrating an example of the operation of the position detection device according to the first embodiment.

That is, as illustrated in FIG. 5, the position detection device 1 of the present embodiment is configured to alternately execute the acquisition process by the processor 23 of the detector 2 and the acquisition process by the processor 33 of the detector 3. That is, the detector 2 transitions to the standby state when the acquisition process ends, stands by until the acquisition process by the detector 3 ends, and then executes the acquisition process again. Similarly, the detector 3 transitions to the standby state when the acquisition process ends, stands by until the acquisition process by the detector 2 ends, and then executes the acquisition process again. Therefore, in the position detection device 1 of the present embodiment, the detector 2 and the detector 3 alternately execute the acquisition process, thereby preventing mutual magnetic interference.

Moreover, in the position detection device 1 of the present embodiment, the processor 23 (processor 33) executes a process of determining whether or not the detector 2 (detector 3) is normal at the time of the execution of the acquisition process. That is, when the detection signal Y1 (detection signal Y2) is not induced in the detection coil 22 (detection coil 32), the processor 23 (processor 33) determines that at least one of the excitation coil 21 and the detection coil 22 is at fault. Then, when the processor 23 (processor 33) determines the fault, the processor 23 (processor 33) outputs a fault signal to the ECU 4 and stops operation of the processor 23 (processor 33).

That is, when the detector 2 is assumed to be a first detector and the detector 3 is assumed to be a second detector, the processes described above will be explained as follows. The processor 23 (first processor) is configured to stop operation of the processor 23 (first processor) when the detection signal Y1 (first detection signal) is not detected in the (first) acquisition process. Similarly, the processor 33 (second processor) is configured to stop operation of the processor 33 (second processor) when the detection signal Y2 (second detection signal) is not detected in the (second) acquisition process.

With this configuration, the acquisition process is not executed by a faulty detector 2 (detector 3), and therefore, the acquisition process can be executed by a normal detector 2 (detector 3). Therefore, with this configuration, it is possible to reduce the possibility of unfavorable mutual interference due to the faulty detector 2 (detector 3). Note that it is optional whether or not this configuration is adopted.

Figure 4:
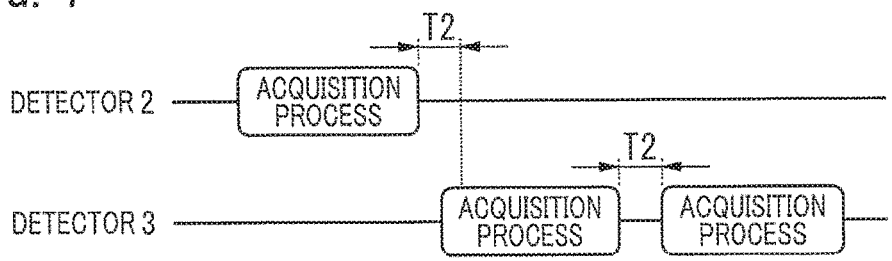
FIG. 4 is a time chart illustrating an example of the operation of the position detection device according to the first embodiment in a case where a fault is detected.

Moreover, in the position detection device 1 of the present embodiment, the processor 23 (processor 33) executes, in the standby state, a process of determining whether or not the detector 2 (detector 3) which is presumably executing the acquisition process is normal. That is, when the processor 23 (processor 33) ends the acquisition process, the processor 23 (processor 33) measures the standby time T2 by using a built-in timer (see FIG. 4). When the detection signal Y4 (detection signal Y3) is not induced in the detection coil 22 (detection coil 32) within the standby time T2, the processor 23 (processor 33) determines that the detector 3 (detector 2) which is presumably executing the acquisition process is at fault. When the processor 23 (the processor 33) determines the fault, the processor 23 (processor 33) executes the acquisition process after the standby time T2 has elapsed. Thereafter, the processor 23 (processor 33) repeats the acquisition process each time when the standby time 12 elapses.

That is, when the detector 2 is assumed to be a first detector and the detector 3 is assumed to be a second detector, the processes described above will be explained as follows. The processor 33 (second processor) has a function of measuring the (second) standby time 12 after the (second) acquisition process has ended. In this case, the processor 33 is configured to execute the (second) acquisition process when the detection signal Y3 (third detection signal) is not detected within the standby time T2. Similarly, the processor 23 (first processor) has a function of measuring the (first) standby time T2 after the (first) acquisition process has ended. In this case, the processor 23 is configured to execute the (first) acquisition process when the detection signal Y4 (fourth detection signal) is not detected within the standby time T2.

With this configuration, even when any fault occurs on the detector 2 (detector 3) executing the acquisition process, the detector 2 (detector 3) in the standby state can continue executing the acquisition process. Therefore, with this configuration, it is possible to avoid a situation where the detector 2 (detector 3) in the standby state remains in that state. Note that it is optional whether or not this configuration is adopted.

In the configuration described above, when the processor 23 (processor 33) determines the fault, the processor 23 (processor 33) may be switched to a mode different from a normal mode to repeat the acquisition process. For example, when the processor 23 (processor 33) determines the fault, the processor 23 (processor 33) may be switched to a mode for shortening the standby time T2. In this case, it is possible to shorten an interval at which the normal processor 23 (processor 33) executes the acquisition process.

That is, the processor 23 (first processor) may be configured to be switched to a mode different from the normal mode to execute the (first) acquisition process when the detection signal Y4 (fourth detection signal) is not detected within the (first) standby time T2. Similarly, the processor 33 (second processor) may be configured to be switched to a mode different from the normal mode to execute the (second) acquisition process when the detection signal Y3 (third detection signal) is not detected within the (second) standby time T2.

The processor 23 (processor 33) performs an output process of outputting a position signal corresponding to a computation result to the ECU 4 via the electric cable 42 (electric cable 45) by using, for example, a built-in Digital to Analog Converter (DAC). The processor 23 (processor 33) may be configured to output a position signal to the ECU 4 by a Pulse Width Modulation (PWM) method. Alternatively, the processor 23 (processor 33) may be configured to output the position signal to the ECU 4 by a wireless signal by use of a radio wave as a medium. With this configuration, the processor 23 (processor 33) and the ECU 4 each require a wireless module. The processor 23 (processor 33) may execute the arithmetic process and the output process described above concurrently with the acquisition process or may execute the arithmetic process and the output process in the standby state.

The ECU 4 has a function of activating the detector 2 and the detector 3 by supplying an operating voltage to the detector 2 (detector 3) via the electric cable 41 (electric cable 44) by considering an operation, for example, starting the engine of a vehicle as a trigger. In the position detection device 1 of the present embodiment, the ECU 4 activates the detector 2 and the detector 3 at the same timing. Note that "the same" is an expression including "the same time" or "substantially the same time." Moreover, the ECU 4 regularly (for example, every 3 ms) reads the position signal output from the detector 2 (detector 3) via the electric cable 42 (electric cable 45). This allows the ECU 4 to recognize the position of the object 100. The ECU 4 executes various processes depending on the position of the object 100. The position signal is output to the ECU 4 in the form of a direct-current voltage at 0.5 V to 4.5 V varying in accordance with, for example, the position of the object 100. Of course, the range does not intend to limit the range of the voltage of the position signal. The ECU 4 may acquire the position signal from at least one of the detector 2 and the detector 3.

Furthermore, the ECU 4 can recognize whether or not the detector 2 (detector 3) includes a fault from the fault signal output from the detector 2 (detector 3) via the electric cable 42 (electric cable 45). The fault signal is output to the ECU 4, for example, in the form of a direct-current voltage lower than or equal to 0.2 V or higher than or equal to 4.8 V. Of course, these voltages do not intend to limit the voltage of the fault signal.

While in the position detection device 1 of the present embodiment, the processor 23 (processor 33) executes the arithmetic process based on the acquired detection signal Y1 (detection signal Y2), other configurations may be possible. For example, the processor 23 (processor 33) may be configured to output the acquired detection signal Y1 (detection signal Y2) to the ECU 4 without executing the arithmetic process. With this configuration, the ECU 4 may compute the position of the object 100 based on the detection signal Y1 (detection signal Y2).

Figure 6:
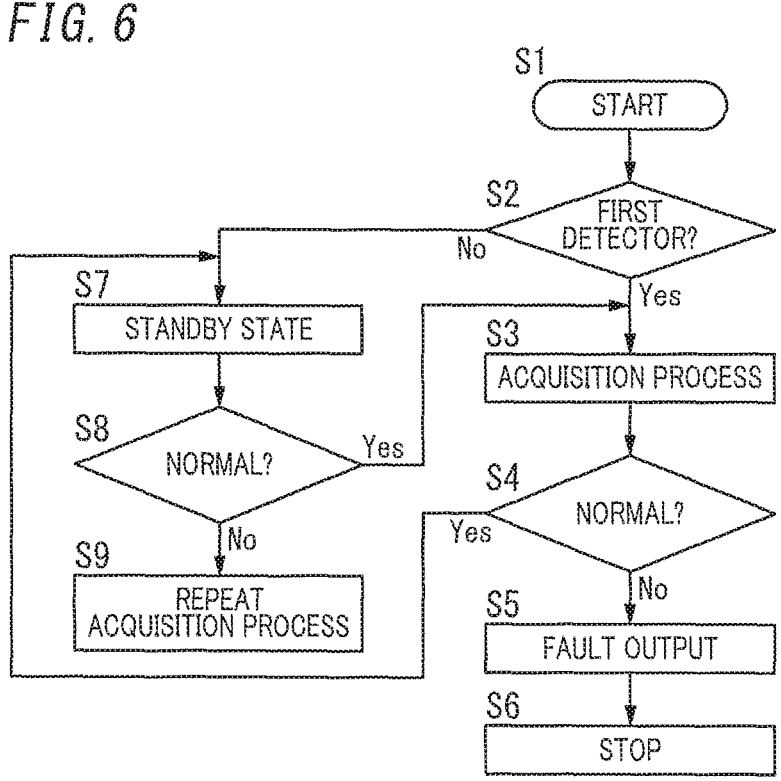
FIG. 6 is a flowchart illustrating an example of the operation of the position detection device according to the first embodiment during a measurement period.

An example of the operation of the position detection device 1 of the present embodiment during the measurement period will be specifically described below with reference to the drawings. In the following description, it is assumed that on activation of the detectors, the detector 2 is a first detector and the detector 3 is a second detector. Of course, on the activation, the detector 3 may be the first detector and the detector 2 may be the second detector. As illustrated in FIG. 6, first, when the ECU 4 activates the detectors 2 and 3, the processor 23 and the processor 33 are initialized respectively in the detector 2 and the detector 3. Then, the monitoring periods start. In the detectors 2 and 3, the measurement periods are started after the monitoring periods have ended (S1). Since the detector 2 is the first detector (S2), the processor 23 executes the acquisition process before the processor 33 (S3).

That is, the processor 23 (first processor) is configured to executes the (first) acquisition process on the activation before the processor 33 (second processor) executes the (second) acquisition process. With this configuration, it is possible to avoid simultaneous execution of the acquisition processes by the detector 2 and the detector 3 on the activation. To realize this configuration, the detector 2 and the detector 3 each previously store information representing which of the first detector and the second detector either the detector 2 or the detector 3 is on the activation. The information may be stored in, for example, a built-in memory of the processor 23 (processor 33) or may be included in a program executed on the activation.

At this time, the processor 23 executes a process of determining whether or not the detector 2 is normal (S4). When the processor 23 determines that the detector 2 is at fault, the processor 23 outputs a fault signal to the ECU 4 (S5) and stops operation of the processor 23 (S6). When the processor 23 determines that the detector 2 is normal, the processor 23 transitions to the standby state (S7). When the processor 23 transitions to the standby state, the processor 23 executes a process similar to the processor 33 described below.

On the other hand, since the detector 3 is the second detector (S2), the processor 33 transitions to the standby state on the activation (S7). The processor 33 determines, in the standby state, a timing to execute the acquisition process based on the detection signal Y3 induced in the detection coil 32 by driving the excitation coil 21.

At this time, the processor 33 executes a process of determining whether or not the detector 2 which is presumably executing the acquisition process is normal (S8). When the processor 33 determines that the detector 2 is normal, the processor 33 executes the acquisition process (S3) in a manner similar to the processor 23 described above. When the processor 33 determines that the detector 2 is at fault, the processor 33 thereafter repeats the acquisition process (S9). At this time, the processor 33 may be switched to a mode different from the normal mode to repeat the acquisition process.

As described above, in the position detection device 1 of the present embodiment, the processor 33 (second processor) intermittently executes the (second) acquisition process during the measurement period such that the time period of the (first) acquisition process is separated from the time period of the (second) acquisition process. The (second) acquisition process is determined at a timing based on the detection signal Y3 (third detection signal) induced in the (second) detection coil 32 by driving the (first) excitation coil 21. That is, in the position detection device 1 of the present embodiment, the processor 33 magnetically detects a timing at which the (first) acquisition process ends. Therefore, the position detection device 1 of the present embodiment does not electrically detect a timing at which the acquisition process ends. Therefore, the position detection device 1 of the present embodiment can prevent the detectors 2 and 3 from being magnetically interfering with each other even when a fault occurs on one of the detectors and the fault electrically influences the remaining detector.

While in the position detection device 1 of the present embodiment, the power supply line (electric cable 41) and the grounding conductor (electric cable 43) are connected to the detector 2 and the power supply line (electric cable 44) and the grounding conductor (electric cable 46) are connected to the detector 3, one power supply line and one grounding conductor may be shared. With this configuration, the detector 2 and the detector 3 are not electrically independent of each other. However, as described above, this configuration can also prevent the detectors 2 and 3 from being magnetically interfering with each other even when a fault occurs on one of the detectors and the fault electrically influences the remaining detector.

<Possibility of Mutual Interference on Activation>

Now, in the position detection device 1 of the present embodiment, the ECU 4 generally activates the detector 2 and the detector 3 at the same timing. Therefore, in the position detection device 1 of the present embodiment, one detector 2 (detector 3) executes the acquisition process on activation of the detector whereas the remaining detector 3 (detector 2) transitions to the standby state on the activation. However, in the position detection device 1 of the present embodiment, it is possible, although very rare, that the detector 2 and the detector 3 are activated at different timings due to, for example, an abnormality in the ECU 4. In this case, in the position detection device 1 of the present embodiment, it is possible that the detector 2 and the detector 3 execute the acquisition processes (that is, time periods during which the excitation coils 21 and 31 operate overlap each other) on activation of the detectors 2 and 3 if later described monitoring periods are not provided. As in this case, when the time periods during which the excitation coils 21 and 31 operate overlap each other, the position detecting process by the detector 2 and the position detecting process by the detector 3 are performed at the same time, which may result in mutual magnetic interference.

<Monitoring Period>

Figure 7:
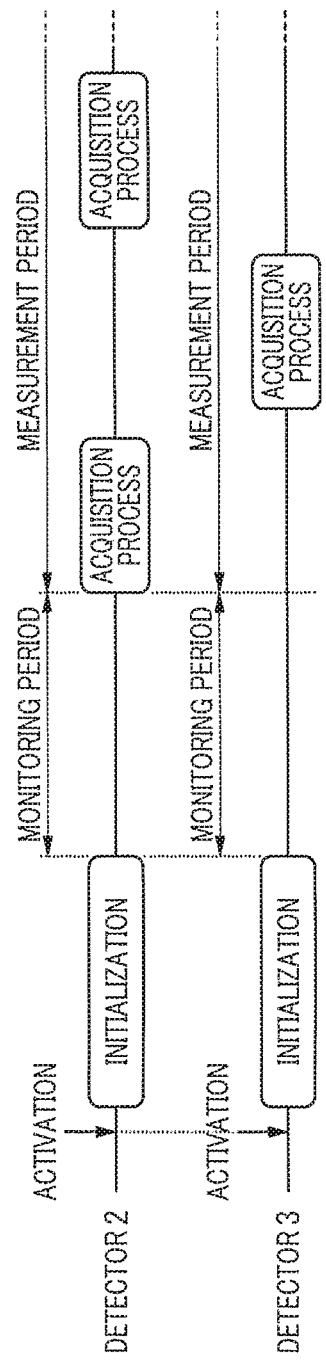
FIG. 7 is a time chart illustrating an example of the operation of the position detection device according to the first embodiment during a monitoring period.

To solve the problem described above, when the detector 2 is assumed to be a first detector and the detector 3 is assumed to be a second detector, the processor 23 (first processor) in the position detection device 1 of the present embodiment is configured such that the monitoring period is started before the measurement period. Similarly, the processor 33 (second processor) is configured such that the monitoring period is started before the measurement period. In particular, as illustrated in FIG. 7, in the position detection device 1 of the present embodiment, the processor 23 (processor 33) is configured such that the monitoring period is started after initialization when the detector 2 (detector 3) is activated. Time required for the initialization is, for example, 10 ms. Moreover, the length of the monitoring period is a predetermined constant length, which is for example, 3 ms. Note that the length of the monitoring period may be variable.

The (first) processor 23 monitors whether or not the (second) processor 33 is executing the (second) acquisition process without driving the (first) excitation coil 21 during the monitoring period. The (first) processor 23 is configured to execute a predetermined process when the (first) processor 23 determines that the (second) processor 33 is executing the (second) acquisition process. Although detailed description will be given later, the predetermined process here is a process to avoid the occurrence of mutual magnetic interference due to simultaneously performed acquisition processes by the detectors 2 and 3.

Here, the (first) processor 23 monitors whether or not a signal (detection signal Y4) is induced in the (first) detection coil 22. The (first) processor 23 is configured to determine that the (second) processor 33 is executing the (second) acquisition process when the signal (detection signal Y4) is induced in the (first) detection coil 22. The (first) processor 23 is configured to transition to the measurement period at the end of the monitoring period when the signal (detection signal Y4) is not induced in the (first) detection coil 22 during the monitoring period.

Similarly, the (second) processor 33 monitors whether or not the (first) processor 23 is executing the (first) acquisition process without driving the (second) excitation coil 31 during the monitoring period. The (second) processor 33 is configured to execute the predetermined process when the (second) processor 33 determines that the (first) processor 23 is executing the (first) acquisition process.

Here, the (second) processor 33 monitors whether or not a signal (detection signal Y3) is induced in the (second) detection coil 32. The (second) processor 33 is configured to determine that the (first) processor 23 is executing the (first) acquisition process when the signal (detection signal Y3) is induced in the (second) detection coil 32 during the monitoring period. The (second) processor 33 is configured to transition to the measurement period at the end of the monitoring period when the signal (detection signal Y3) is not induced in the (second) detection coil 32 during the monitoring period.

An example of the operation of the position detection device 1 of the present embodiment including the monitoring period will be described below. The term "activation" in the following description includes activation by supplying the processor 23 (processor 33) with the operating voltage from the ECU 4 and a restart by resetting the processor 23 (processor 33) at the occurrence of any abnormality. Alternatively or additionally, the term "activation" includes a restart of the processor 23 (processor 33) at the time of recovery from the momentary power failure or the momentary voltage drop. The operation of the processor 23 (processor 33) during the measurement period may be an operation of intermittently executing the acquisition process, and is not limited to the operation described in <Measurement Period>.

First, with reference to FIG. 7, a case where the detector 2 and the detector 3 are activated at the same timing will be described. In this case, the monitoring period of the processor 23 substantially coincides with the monitoring period of the processor 33. Therefore, since the detection signal Y4 is not induced in the detection coil 22 during the monitoring period, the processor 23 executes the acquisition process at the end of the monitoring period and transitions to the measurement period. Since the detection signal Y3 is not induced in the detection coil 32 during the monitoring period, the processor 33 transitions to the standby state at the end of the monitoring period and transitions to the measurement period. Thereafter, the processor 23 and the processor 33 intermittently execute the acquisition processes such that the time periods during which the acquisition processes are executed do not overlap each other.

Figure 8A:
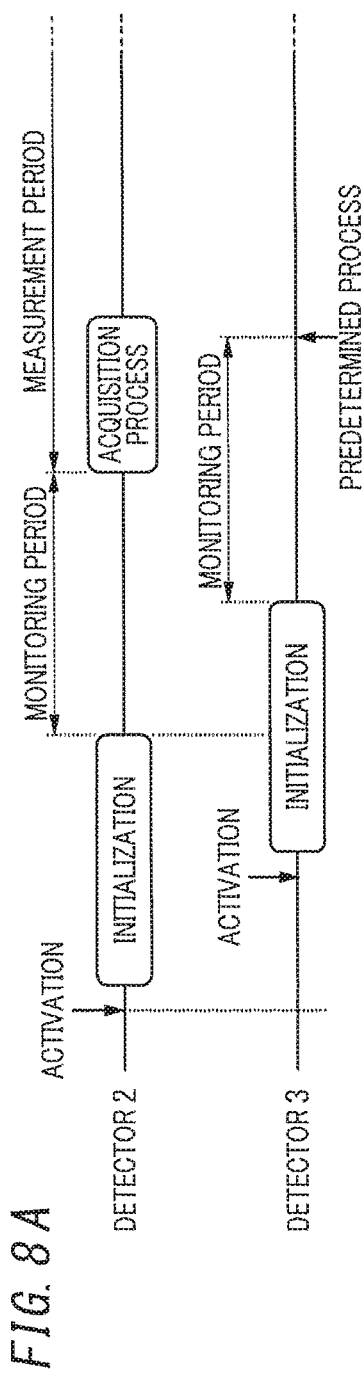
FIGS. 8A and 8B are time charts each illustrating an example of the operation of the position detection device according to the first embodiment in a case where the detectors are activated at different timings.

Next, with reference to FIG. 8A, a case where the activation of the detector 3 lags the activation of the detector 2 will be described. In this case, since the detection signal Y4 is not induced in the detection coil 22 during the monitoring period, the processor 23 executes the acquisition process at the end of the monitoring period and transitions to the measurement period. The monitoring period of the processor 33 overlaps a time period during which the processor 23 executes the acquisition process. Therefore, during the monitoring period of the processor 33, the detection signal Y3 is induced in the detection coil 32. Therefore, the processor 33 executes the predetermined process at the end of the monitoring period.

Figure 8B:
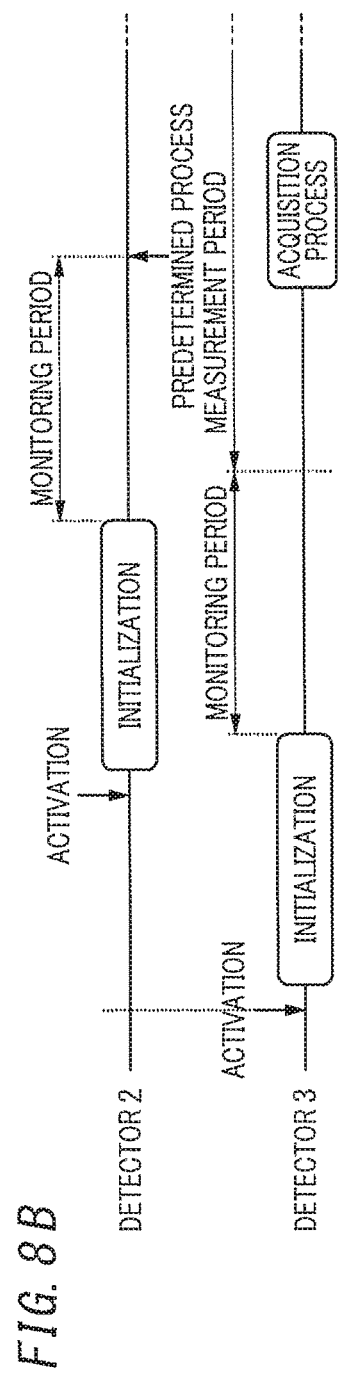

Next, with reference to FIG. 8B, a case where the activation of the detector 2 lags the activation of the detector 3 will be described. In this case, since the detection signal Y3 is not induced in the detection coil 32 during the monitoring period, the processor 33 transitions to the standby state at the end of the monitoring period and transitions to the measurement period. The monitoring period of the processor 23 overlaps a time period during which the processor 33 executes the acquisition process. Therefore, during the monitoring period of the processor 23, the detection signal Y4 is induced in the detection coil 22. Therefore, the processor 23 executes the predetermined process at the end of the monitoring period.

As described above, in the position detection device 1 of the present embodiment, when the detector 2 is assumed to be a first detector and the detector 3 is assumed to be a second detector, the processor 33 (second processor) has the following configuration. That is, the (second) processor 33 is configured to monitor whether or not the (first) processor 23 is executing the (first) acquisition process during the monitoring period set before the measurement period, and the (second) processor 33 is configured to execute a predetermined process when the (first) processor 23 is executing the (first) acquisition process.

Therefore, the (second) detector 3 can execute the predetermined process based on the result of the determination of whether or not the (first) detector 2 is executing the (first) acquisition process during the monitoring period. Therefore, the position detection device 1 of the present embodiment can reduce the possibility that the first acquisition process and the second acquisition process are simultaneously executed on activation of the detectors 2 and 3, that is, the possibility that time periods during which the excitation coils 21 and 31 operate overlap each other.

Here, the predetermined process may be a process of allowing transition to the measurement period based on a signal induced during the monitoring period. In other words, the predetermined process, when executed by the processor 33 (second processor), may be a process of adjusting a starting time point of the measurement period of the (second) processor 33 so as not to overlap the (first) acquisition process. Similarly, the predetermined process, when executed by the processor 23 (first processor), may be a process of adjusting a starting time point of the measurement period of the (first) processor 33 so as not to overlap the (second) acquisition process. For example, there may be a case where inducing the detection signal Y4 (detection signal Y3) in the detection coil 22 (detection coil 32) is started from the starting time point of the monitoring period, and the inducing the detection signal Y4 (detection signal Y3) ends before the monitoring period ends. In this case, the processor 23 (processor 33) starts the acquisition process at a timing based on the end of the detection signal Y4 (detection signal Y3).

Moreover, for example, there may be a case where inducing the detection signal Y4 (detection signal Y3) in the detection coil 22 (detection coil 32) is started during the monitoring period, and the inducing the detection signal Y4 (detection signal Y3) does not end by the time the monitoring period ends. In this case, the processor 23 (processor 33) starts the acquisition process at a timing based on the starting time point of the inducing the detection signal Y4 (detection signal Y3).

Furthermore, for example, there may be a case where inducing the detection signal Y4 (detection signal Y3) in the detection coil 22 (detection coil 32) is started during the monitoring period, and the inducing the detection signal Y4 (detection signal Y3) ends before the monitoring period ends. In this case, the processor 23 (processor 33) starts the acquisition process at a timing based on one of the starting time point and the end of the inducing the detection signal Y4 (detection signal Y3).

In any of the above-described cases, the detectors 2 and 3 can transition to the measurement periods while avoiding mutual magnetic interference.

The predetermined process, when executed by the processor 33 (second processor), may be a process of stopping the operation of the processor 33. Similarly, the predetermined process, when executed by the processor 23 (first processor), may be a process of stopping the operation of the processor 23. In this case, the acquisition process is not executed by a detector 2 (detector 3) which presumably includes any fault, and therefore, the acquisition process can be executed by the normal detector 2 (detector 3). Therefore, in this case, it is possible to reduce the possibility of unfavorable mutual interference due to the detector 2 (detector 3) which presumably includes any fault.

Moreover, as illustrated in, for example, FIGS. 7, 8A, and 8B, the processor 23 (first processor) in the position detection device 1 of the present embodiment is configured as follows. The (first) processor 23 monitors whether or not the (second) processor 33 is executing the (second) acquisition process without driving the (first) excitation coil 21 during the monitoring period of the (first) processor 23. The (first) processor 23 is configured to execute the (first) acquisition process at the end of the monitoring period when the (second) processor 33 is not executing the (second) acquisition process. That is, the processor 23 (first processor) is configured to execute the (first) acquisition process at the end of the monitoring period before the processor 33 (second processor) executes the (second) acquisition process.

With this configuration, it is possible to avoid simultaneous execution of the acquisition processes by the detector 2 and the detector 3 at the end of the monitoring period. Note that it is optional whether or not this configuration is adopted.

<Possibility of Mutual Interference During Measurement Period>

Figure 9:
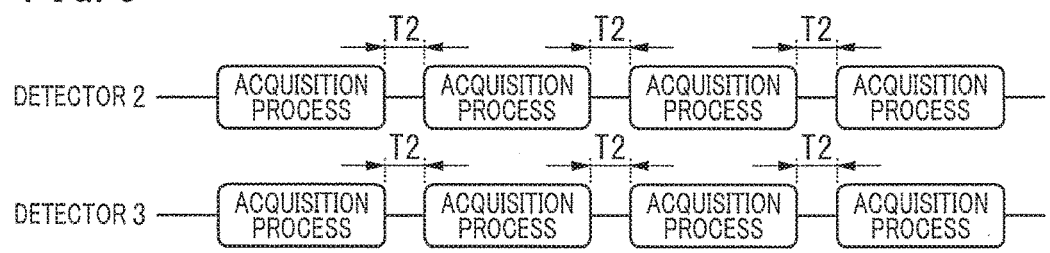
FIG. 9 is a time chart illustrating an example of the operation of the position detection device according to the first embodiment in a case where the detectors execute acquisition processes almost at the same timing.

Here, in the position detection device 1 of the present embodiment, it is possible, although very rare, that the detector 2 and the detector 3 execute the acquisition processes almost at the same timing during the measurement periods. With reference to FIG. 9, an example of the operation in such a case will be described below. The processor 23 of the detector 2 transitions to the standby state when the acquisition process ends. Here, since the detector 2 and the detector 3 execute the acquisition processes almost at the same timing, the detection signal Y4 is not induced in the detection coil 22 during a period after the end of the acquisition process until the standby time T2 elapses. Therefore, the processor 23 executes the acquisition process again after the standby time T2 has elapsed. The processor 33 of the detector 3 also transitions to the standby state when the acquisition process ends. Here, the detection signal Y3 is not induced in the detection coil 32 during a period from the end of the acquisition process until the standby time T2 elapses. Therefore, the processor 33 also executes the acquisition process again after the standby time T2 has elapsed.

Therefore, the detector 2 and the detector 3 repeatedly execute the acquisition processes almost at the same timing. Here, even when timings at which the detector 2 and the detector 3 execute the acquisition processes coincide with each other, the cycles or the phases of signals output from the excitation coil 21 and the excitation coil 31 respectively driven by the detector 2 and detector 3 do not completely match each other, and therefore, magnetic mutual interference occurs. Thus, the detector 2 and the detector 3 may continue outputting position signals involving errors.

Now, a first variation and a second variation which solve the above-described problem during the measurement period will be described below.

(First Variation)

Figure 10:
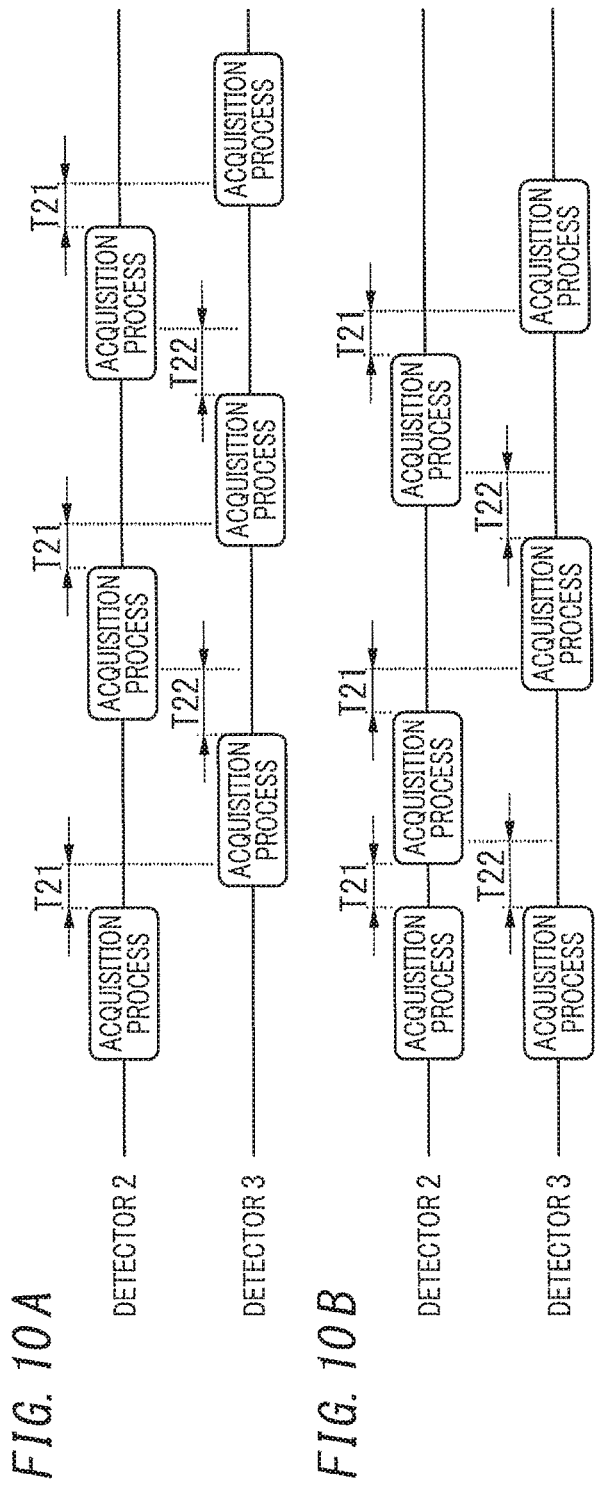
FIG. 10A is a time chart illustrating an example of the operation of a position detection device according to a first variation.
FIG. 10B is a time chart illustrating an example of the operation of the position detection device according to the first variation in a case where the detectors execute the acquisition processes almost at the same timing.

As illustrated in FIG. 10A, in a position detection device 1 of the first variation, a standby time T22 of a detector 3 is set to be longer than a standby time T21 of a detector 2. That is, when the detector 2 is assumed to be a first detector and the detector 3 is assumed to be a second detector, the length of the (first) standby time T21 set by a processor 23 (first processor) and the length of the (second) standby time T22 set by a processor 33 (second processor) are different from each other.

With reference the FIG. 10B, an example of the operation of the position detection device 1 of the first variation will be described below, wherein the detector 2 and the detector 3 execute acquisition processes almost at the same timing. The processor 23 of the detector 2 transitions to the standby state when the acquisition process ends. Here, since the detector 2 and the detector 3 execute the acquisition processes almost at the same timing, the detection signal Y4 is not induced in the detection coil 22 during a period after the end of the acquisition process until the standby time T21 elapses. Therefore, the processor 23 executes the acquisition process again after the standby time T21 has elapsed.

The processor 33 of the detector 3 also transitions to the standby state when the acquisition process ends. Here, the processor 23 executes the acquisition process during a period after the end of the acquisition process until the standby time T22 elapses. Therefore, since a detection signal Y3 is induced in a detection coil 32 within the standby time T22, the processor 33 determines a timing to execute the acquisition process based on the detection signal Y3. Then, the processor 33 executes the acquisition process at the determined timing. Thereafter, the detector 2 and the detector 3 alternately execute the acquisition process.

As described above, the position detection device 1 of the first variation can resume the acquisition process in a normal mode even when the detector 2 and the detector 3 executes the acquisition processes almost at the same timing.

(Second Variation)

Figure 11:
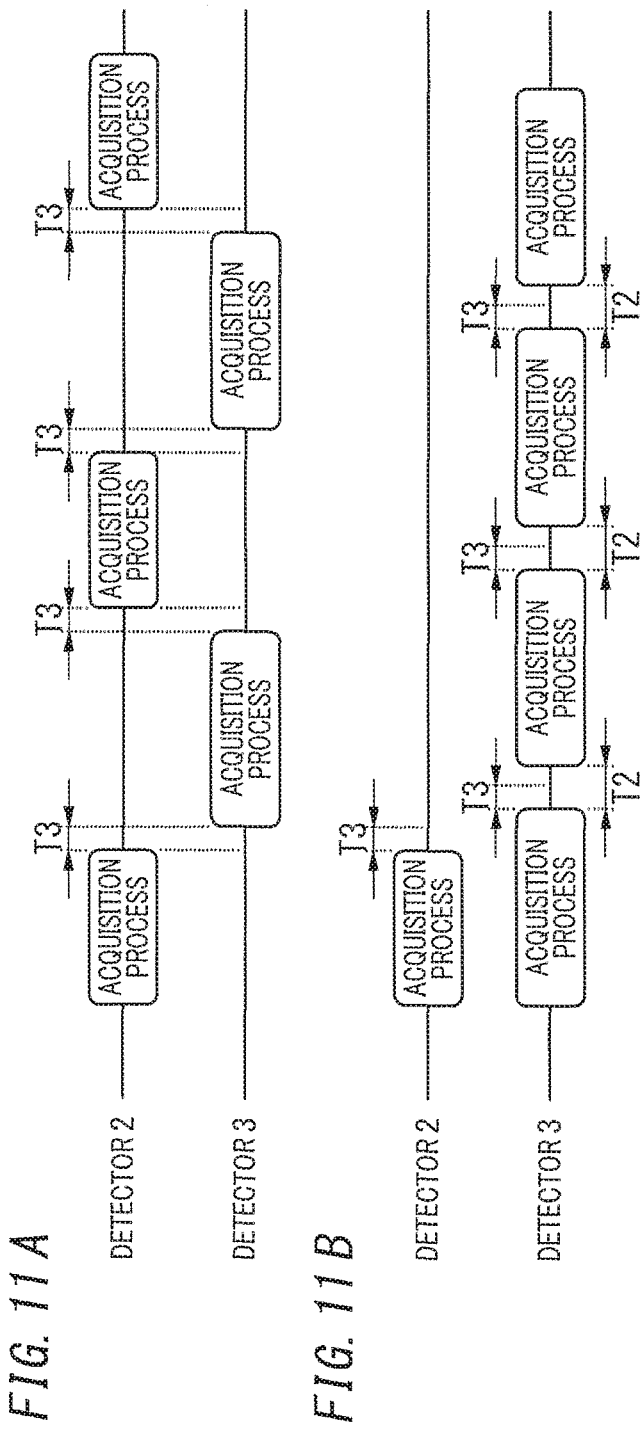
FIG. 11A is a time chart illustrating an example of the operation of a position detection device according to a second variation.
FIG. 11B is a time chart illustrating an example of the operation of the position detection device according to the second variation in a case where the detectors execute the acquisition processes almost at the same timing.

As illustrated in FIG. 11A, a processor 23 (processor 33) of a detector 2 (detector 3) in a position detection device 1 of a second variation has a function of measuring a determination time T3 when the acquisition process ends. The processor 23 (processor 33) determines that the detector 2 (detector 3) is at fault when a detection signal Y4 (detection signal Y3) is induced in a detection coil 22 (detection coil 32) within the determination time T3. When the processor 23 (processor 33) determines the fault, the processor 23 (processor 33) outputs a fault signal to an ECU 4 and stops operation of the processor 23 (processor 33). Moreover, as illustrated in FIG. 11A, in the position detection device 1 of the second variation, a time period during which the processor 33 executes the acquisition process is longer than a time period during which the processor 23 executes the acquisition process.

That is, when the detector 2 is assumed to be a first detector and the detector 3 is assumed to be a second detector, the processor 33 (second processor) has a function of measuring the determination time T3 when the (second) acquisition process ends. The processor 33 is configured to stop operation of the processor 33 when the detection signal Y3 (third detection signal) is detected within the determination time T3. Similarly, the processor 23 (first processor) has a function of measuring the determination time T3 when the (first) acquisition process ends. The processor 23 is configured to stop operation of the processor 23 when the detection signal Y4 (fourth detection signal) is detected within the determination time T3. The length of the time period during which the (first) acquisition process is executed and the length of the time period during which the (second) acquisition process is executed are preferably different from each other.

With reference to FIG. 11B, an example of the operation of the position detection device 1 of the second variation will be described below, wherein the detector 2 and the detector 3 execute acquisition processes almost at the same timing. The processor 23 of the detector 2 measures the determination time T3 when the acquisition process ends. Here, the time period during which the processor 33 of the detector 3 executes the acquisition process is longer than the time period during which the processor 23 executes the acquisition process. Therefore, the detection signal Y4 is induced in the detection coil 22 within the determination time T3. Thus, the processor 23 determines the fault, and stops operation of the processor 23.

The processor 33 of the detector 3 also measures the determination time T3 when the acquisition process ends. Here, the processor 23 has stopped operation of the processor 23, and therefore, the detection signal Y3 is not induced in the detection coil 32 within the determination time T3. Therefore, the processor 33 executes the acquisition process again after the standby time T2 has elapsed. Thereafter, the processor 33 executes the acquisition process every standby time T2.

As described above, when the detector 2 and the detector 3 execute the acquisition processes almost at the same timing, the position detection device 1 of the second variation determines that mutual interference exists, and the processor 23 (processor 33) of one detector 2 (detector 3) stops operation of the processor 23 (processor 33). Therefore, the position detection device 1 of the second variation avoids a state in which mutual magnetic interference occurs, and can continue the acquisition process by using the remaining detector 2 (detector 3).

Second Embodiment

While in the position detection device 1 of the first embodiment, the processor 23 (processor 33) monitors whether or not the detection signal Y4 (detection signal Y3) is induced in the detection coil 22 (detection coil 32) during the monitoring period, other configurations may be possible. A position detection device 1 according to a second embodiment of the present invention will be described below with reference to the drawings. The description of elements of the position detection device 1 of the present embodiment which are shown in the position detection device 1 of the first embodiment is accordingly omitted.

Figure 12:
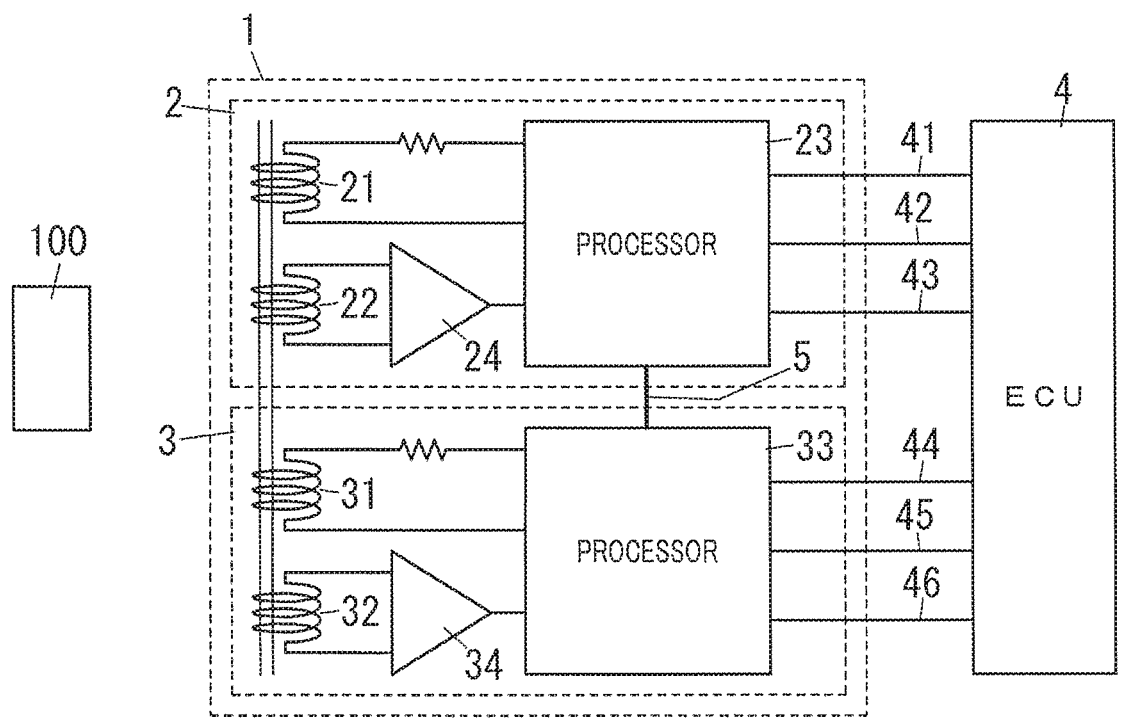
FIG. 12 is a view schematically illustrating the configuration of an example of a position detection device according to a second embodiment.

As illustrated in FIG. 12, the position detection device 1 of the present embodiment includes a (first) processor 23 and a (second) processor 33 which are electrically connected to each other via one communication line 5. The (first) processor 23 and the (second) processor 33 can perform bidirectional communication via the one communication line 5.

Specifically, the processor 23 (processor 33) includes a signal generation unit configured to generate a signal flowing through the communication line 5. The signal generation unit includes a series circuit of a pull-up resister and a switch and is electrically connected between a power supply and circuit ground of the processor 23 (processor 33). A first connection point of the pull-up resister and the switch of the processor 23 and a second connection point of the pull-up resister and the switch of the processor 33 are electrically connected to each other via the communication line 5. In a case where the communication line 5 is not connected, a voltage between the first connection point and the circuit ground is hereinafter referred to as a "first output voltage V1," and a voltage between the second connection point and the circuit ground is hereinafter referred to as a "second output voltage V2."

The processor 23 (processor 33) is configured to turn on the switch while executing the acquisition process and to turn off the switch while not executing the acquisition process. Therefore, the first output voltage V1 is at a low (L) level while the processor 23 is executing the acquisition process, and the first output voltage V1 is at a high (H) level while the processor 23 is not executing the acquisition process. Similarly, the second output voltage V2 is at the L level while the processor 33 is executing the acquisition process, and the second output voltage V2 is at the H level while the processor 33 is executing the acquisition process.

Here, the first connection point and the second connection point are electrically connected to each other via the communication line 5 in practice. Therefore, the potential of the communication line 5 is a logical conjunction of the first output voltage V1 and the second output voltage V2. That is, the (first) processor 23 is configured to change the first output voltage V1 (to change the signal flowing through the communication line 5) while executing the (first) acquisition process. Similarly, the (second) processor 33 is configured to change the second output voltage V2 (to change the signal flowing through the communication line 5) while executing the (second) acquisition process. One processor 23 (processor 33) monitors the potential of the communication line 5, thereby determining whether or not the remaining processor 33 (processor 23) is executing the acquisition process.

Figure 13:
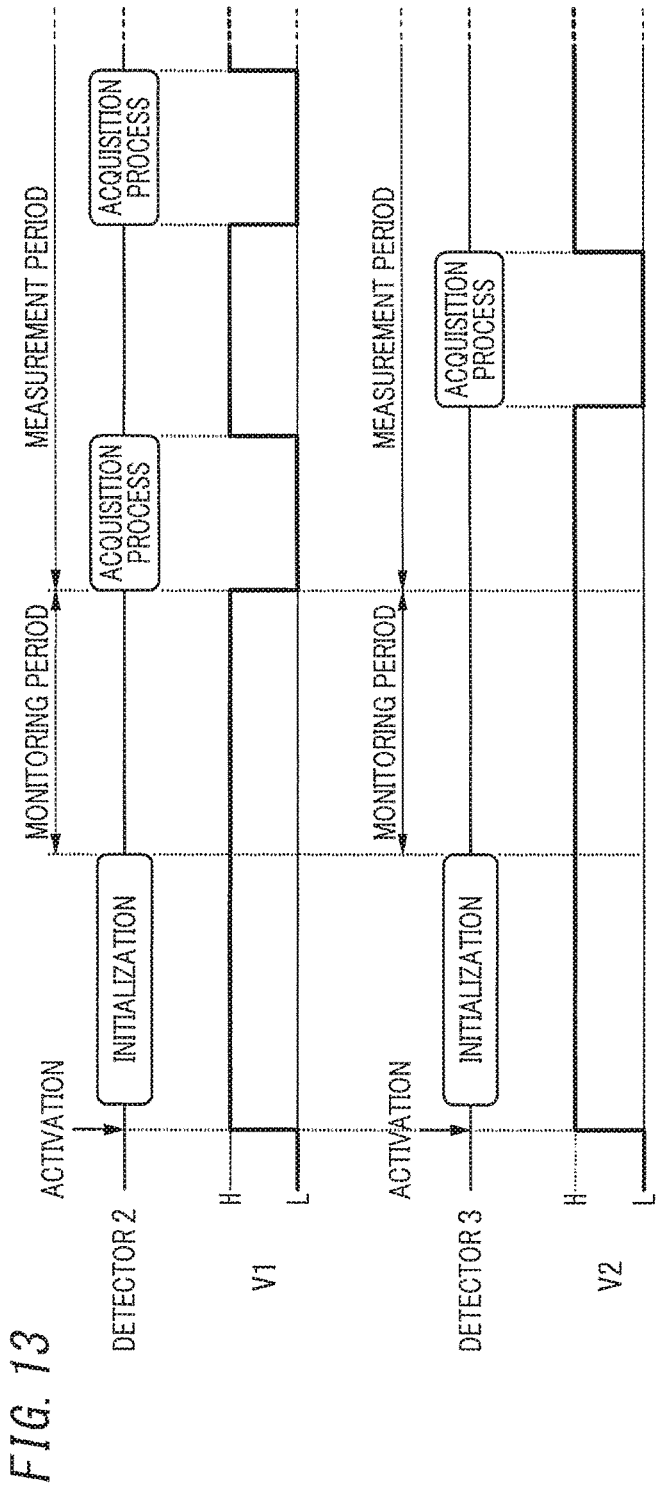
FIG. 13 a time chart illustrating an example of the operation of the position detection device according to the second embodiment during the monitoring period.

An example of the operation of the position detection device 1 of the present embodiment including the monitoring period will be described below. First, with reference to FIG. 13, a case where a detector 2 and a detector 3 are activated at the same timing will be described. In this case, the monitoring period of the processor 23 substantially coincides with the monitoring period of the processor 33. Therefore, during the monitoring period of the processor 23 (processor 33), the first output voltage V1 and the second output voltage V2 remain at the H level and do not change. That is, during the monitoring period of the processor 23 (processor 33), the potential of the communication line 5 does not change.

Therefore, since the potential of the communication line 5 does not change (the signal flowing through the communication line 5 does not change) during the monitoring period, the processor 23 executes the acquisition process at the end of the monitoring period and transitions to the measurement period. Since the potential of the communication line 5 does not change (the signal flowing through the communication line 5 does not change) during the monitoring period, the processor 33 transitions to the standby state at the end of the monitoring period and then transitions to the measurement period. Thereafter, the processor 23 and the processor 33 intermittently execute the acquisition processes such that the time periods during which the acquisition processes are executed do not overlap each other.

Figure 14:
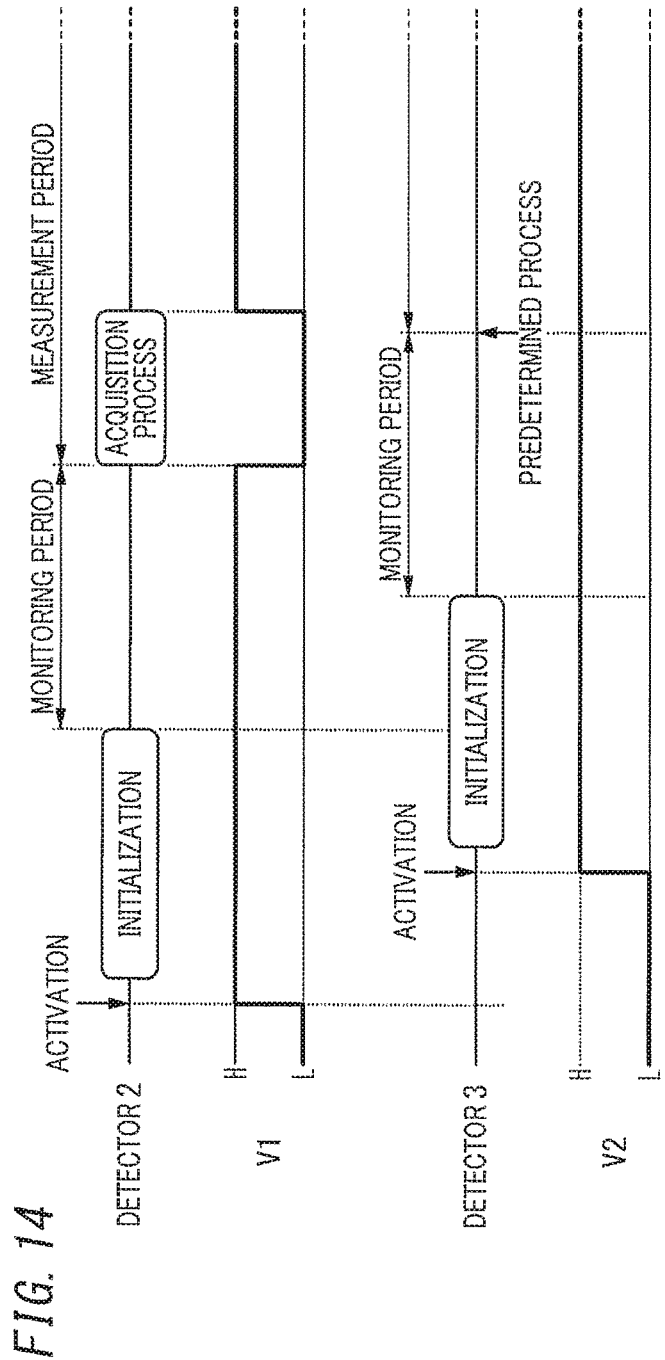
FIG. 14 is a time chart illustrating an example of the operation of the position detection device according to the second embodiment in a case where the detectors are activated at different timings.

Next, with reference to FIG. 14, a case where the activation of the detector 3 lags the activation of the detector 2 will be described. In this case, since the potential of the communication line 5 does not change (the signal flowing through the communication line 5 does not change) during the monitoring period, the processor 23 executes the acquisition process at the end of the monitoring period and transitions to the measurement period. The monitoring period of the processor 33 overlaps a time period during which the processor 23 executes the acquisition process. Therefore, during the monitoring period of the processor 33, the first output voltage V1 changes from the H level to the L level. That is, during the monitoring period of the processor 33, the potential of the communication line 5 changes (the signal flowing through the communication line 5 changes). Therefore, the processor 33 determines that the processor 23 is executing the acquisition process during the monitoring period, and the processor 33 executes the predetermined process at the end of the monitoring period.

As described above, in the position detection device 1 of the present embodiment, the (first) processor 23 and the (second) processor 33 are electrically connected to each other via the communication line 5. The (second) processor 33 is configured to determine that the (first) processor 23 is executing the (first) acquisition process when a change is caused in the signal flowing through the communication line 5 during the monitoring period. Also with this configuration, the (second) detector 3 can execute the predetermined process based on the result of the determination of whether or not the (first) detector 2 is executing the (first) acquisition process during the monitoring period.

In the position detection device 1 of the present embodiment, the (first) processor 23 and the (second) processor 33 may be capable of communicating with each other. For example, the (first) processor 23 and the (second) processor 33 may be electrically connected with each other via two communication lines 5. With this configuration, unidirectional communication from the (first) processor 23 to the (second) processor 33 and unidirectional communication from the (second) processor 33 to the (first) processor 23 can be performed by using the two communication lines 5. In the processor 23 (processor 33), the communication line 5 may be electrically connected to circuit ground via a pull-down resistor. With this configuration, the switch may be electrically connected between the power supply and the communication line 5.

Third Embodiment

A position detection device 1 according to a third embodiment of the present invention will be described below with reference to the drawings. The description of elements of the position detection device 1 of the present embodiment which are shown in the position detection device 1 of the first embodiment is accordingly omitted.

<Possibility of Mutual Interference During Measurement Period>

Figure 15A:
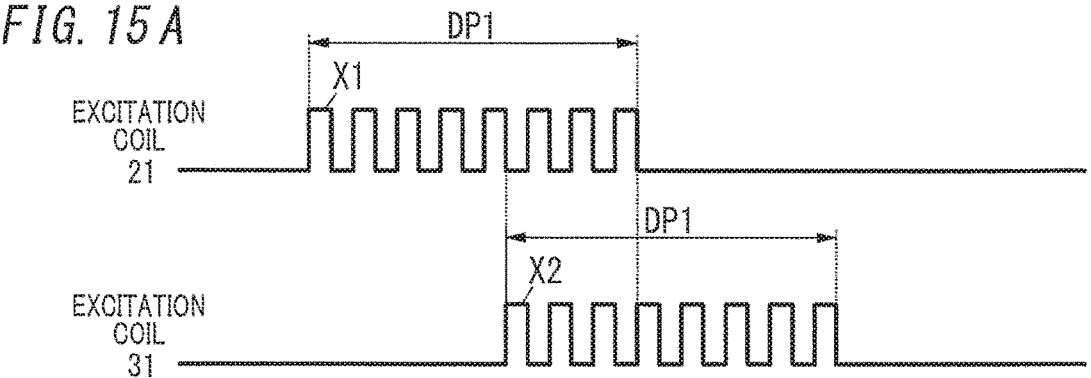
FIG. 15A is a waveform chart of drive signals in a position detection device according to a third embodiment in a case where drive periods of excitation coils of detectors overlap each other is illustrated, and FIG. 15 B is a waveform chart of a detection signal.

It is possible, although very rare, that due to, for example, a temporal abnormality of a processor 23 (processor 33), a time period during which the processor 23 executes the acquisition process and a time period during which the processor 33 executes the acquisition process partly overlap each other. The time period during which the processor 23 (processor 33) executes the acquisition process is hereinafter referred to as an "execution time period DP1." That is, as an example illustrated in FIG. 15A, an event occurs in which the execution time period DP1 of the processor 23 and the execution time period DP1 of the processor 33 partly overlap each other. This event may also occur when, for example, noise is induced in the detection coil 22 (detection coil 32) and the processor 23 (processor 33) erroneously determines the induction of the noise as acquisition of a detection signal Y4 (detection signal Y3), which results in deviation in timing at which the acquisition process is started. When the event described above occurs, any measures have to be taken. Otherwise, the detectors 2 and 3 would continue magnetically interfering with each other and would continue outputting position signals including errors.

To solve the problem described above, when the detector 2 is assumed to be a first detector and the detector 3 is assumed to be a second detector, the processor 23 (first processor) in the position detection device 1 of the present embodiment has the following configuration. That is, the (first) processor 23 is configured to monitor whether or not a change is caused in a signal (detection signal Y1) induced in a (first) detection coil 22 while executing the (first) acquisition process. The (first) processor 23 is configured to execute a predetermined process when the change is caused in the signal (detection signal Y1). While detailed description will be given later, the predetermined process here is a process to prevent the detectors 2 and 3 from continuing magnetically interfering with each other.

Similarly, the (second) processor 33 is configured to monitor whether or not a change is caused in a signal (detection signal Y2) induced in a (second) detection coil 32 while executing the (second) acquisition process. The (second) processor 33 is configured to execute the predetermined process when the change is caused in the signal (detection signal Y2).

In the position detection device 1 of the present embodiment, the processor 23 (processor 33) has the following configuration to monitor whether or not a change is caused in the detection signal Y1 (detection signal Y2). That is, the processor 23 (processor 33) is configured to sample the detection signal Y1 (detection signal Y2) at a frequency higher than the frequency of a drive signal X1 (drive signal X2) to obtain data, and to compute the phase and the amplitude of the detection signal Y1 (detection signal Y2) from the obtained data. With this configuration, the processor 23 (processor 33) obtains data of the phase and the amplitude of the detection signal Y1 (detection signal Y2) in real time, thereby monitoring changes in the phase and the amplitude of the detection signal Y1 (detection signal Y2). A sampling frequency is preferably set such that one half of the sampling frequency (i.e., Nyquist frequency) is higher than or equal to the frequency of the drive signal X1 (drive signal X2).

An example of the operation of the position detection device 1 of the present embodiment will be described below. When the detectors 2 and 3 do not magnetically interfere with each other, no change is caused in the detection signal Y1 (detection signal Y2). In this case, the processor 23 (processor 33) determines that time periods during which excitation coils 21 and 31 operate do not overlap each other, and the processor 23 (processor 33) executes the acquisition process as usual. As previously described, in the position detection device 1 of the present embodiment, the processors 23 and 33 execute the acquisition processes such that time periods during which the acquisition processes are performed are separated from each other.

Figure 15B:
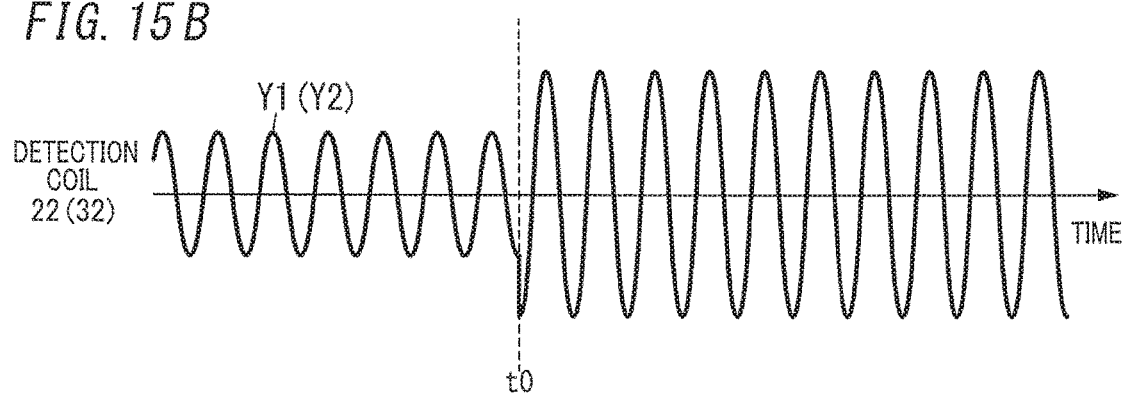

On the other hand, when the detectors 2 and 3 magnetically interfere with each other, one or both of the phase and the amplitude of the detection signal Y1 (detection signal Y2) change with a time point of the occurrence of mutual interference as a border. For example, as an example illustrated in FIG. 15B, when the mutual interference occurs after time t0, the phase and the amplitude of the detection signal Y1 (detection signal Y2) change with the time t0 as a border. In this case, the processor 23 (processor 33) determines that time periods during which the excitation coils 21 and 31 operate overlap each other, and the processor 23 (processor 33) executes the predetermined process.

That is, when the detector 2 is assumed to be a first detector and the detector 3 is assumed to be a second detector, the processor 33 (second processor) in the position detection device 1 of the present embodiment has the following configuration. That is, the (second) processor 33 is configured to monitor whether or not a change is caused in the signal (detection signal Y2) induced in the (second) detection coil 32 in the (second) acquisition process. Therefore, the (second) processor 33 can monitor whether or not the detectors 2 and 3 magnetically interfere with each other (i.e., whether or not time periods during which the excitation coils 21 and 31 operate overlap each other). The (second) processor 33 is configured to execute the predetermined process when a change is caused in the signal (detection signal Y2) (i.e., when the time periods during which the excitation coils 21 and 31 operate overlap each other). Therefore, the position detection device 1 of the present embodiment executes the predetermined process when the time periods during which the excitation coils 21 and 31 operate overlap each other, thereby preventing the detectors 2 and 3 from continuing magnetically interfering with each other.

Here, the predetermined process, when executed by the processor 33 (second processor), may be a process of executing the (second) acquisition process so as not to overlap the (first) acquisition process. Similarly, the predetermined process, when executed by the processor 23 (first processor), may be a process of executing the (first) acquisition process so as not to overlap the (second) acquisition process.

For example, when the detectors 2 and 3 magnetically interfere with each other, the (first) processor 23 may execute the (first) acquisition process based on a timing at which the mutual interference occurs (i.e., based on a timing at which a change is caused in the detection signal Y1) such that the (first) acquisition process does not overlap the (second) acquisition process. Similarly, when the detectors 2 and 3 magnetically interfere with each other, the (second) processor 33 may execute the (second) acquisition process based on a timing at which the mutual interference occurs (i.e., based on a timing at which a change is caused in the detection signal Y2) such that the (second) acquisition process does not overlap the (first) acquisition process.

Moreover, for example, when the detectors 2 and 3 magnetically interfere with each other, the (first) processor 23 may transition to the standby state and may execute the (first) acquisition process at a timing based on the detection signal Y4 induced in the (first) detection coil 22 in the standby state. Similarly, when the detectors 2 and 3 magnetically interfere with each other, the (second) processor 33 may transition to the standby state and may execute the (second) acquisition process at a timing based on the detection signal Y3 induced in the (second) detection coil 32 in the standby state.

Any of the configurations can prevent the detectors 2 and 3 from continuing magnetically interfering with each other.

The predetermined process, when executed by the processor 33 (second processor), may be a process of stopping the operation of the processor 33. Similarly, the predetermined process, when executed by the processor 23 (first processor), may be a process of stopping the operation of the processor 23. In this case, the acquisition process is not executed by the detector 2 (detector 3) which presumably includes any abnormality, and therefore, the acquisition process can be executed by the normal detector 2 (detector 3). Therefore, in this case, it is possible to reduce the possibility of unfavorable mutual interference due to the detector 2 (detector 3) which presumably includes any abnormality.

The processor 23 (processor 33) may have the following configuration in order to monitor whether or not a change is caused in the detection signal Y1 (detection signal Y2). That is, the processor 23 (processor 33) may be configured to acquire the detection signal Y1 (detection signal Y2) during a sampling period different from a period represented by using a natural number M as M/2 times the period of the drive signal X1 (drive signal X2). Here, the detection signal Y1 (detection signal Y2) is a signal induced in the detection coil 22 (detection coil 32). For example, the processor 23 (processor 33) may be configured to sample the detection signal Y1 (detection signal Y2) at a period of N+(1/L) times the period of the drive signal X1 (drive signal X2), where N is an integer greater than or equal to 0, and L is an integer greater than or equal to 3.

As an example, here, it is assumed that the processor 23 (processor 33) samples the detection signal Y1 (detection signal Y2) at a period of 5/4 times the period of the drive signal X1 (drive signal X2) (i.e., N=1, L=4). When the detectors 2 and 3 do not magnetically interfere with each other, the processor 23 (processor 33) acquires data having the same voltage value (or signal value) every period of L times the sampling period.

Figure 16:
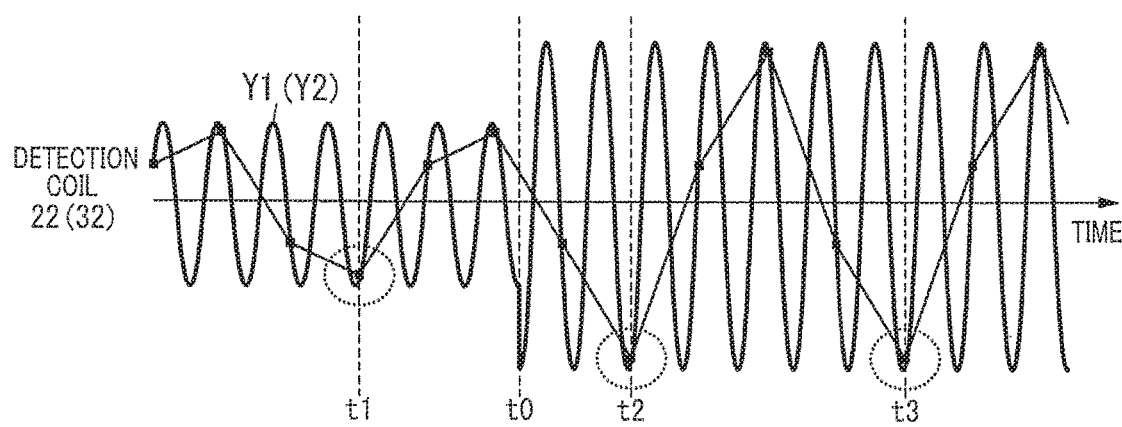
FIG. 16 is a waveform chart illustrating an example of sampling of the detection signal in the position detection device according to the third embodiment.

On the other hand, when the detectors 2 and 3 magnetically interfere with each other, at least one of the phase and the amplitude of the detection signal Y1 (detection signal Y2) changes. In this case, for example, as illustrated in FIG. 16, when the mutual interference occurs at the time t0, a change is caused in data acquired by the processor 23 (processor 33) around the time t0. Specifically, data acquired at a time t1 before the time t0 is different from data acquired at times t2 and t3 after the time t0. The time period from the time t1 to the time t2 and the time period from the time t2 to the time t3 are each equal to L times the sampling period.

As described above, with this configuration, the processor 23 (processor 33) monitors whether or not a change is caused in data in each period having a length equal to L times the sampling period, thereby monitoring whether or not a change is caused in the detection signal Y1 (detection signal Y2). With this configuration, sampling can be performed at a period longer than the period of the drive signal X1 (drive signal X2). Therefore, for example, a microcontroller having a low processing speed can be used as the processor 23 (processor 33), thereby reducing manufacturing cost.

Fourth Embodiment

A position detection device 1 according to a fourth embodiment of the present invention will be described below with reference to the drawings. The description of elements of the position detection device 1 of the present embodiment which are shown in the position detection device 1 of the third embodiment is accordingly omitted.

As previously described in connection with the first embodiment, it is possible, although very rare, that when a detector 2 and a detector 3 are activated at different timings due to an abnormality in an ECU 4, or the like, the detector 2 and the detector 3 execute the acquisition processes almost at the same timing. Also when a temporal abnormality occurs in a processor 23 (processor 33) or when the processor 23 (processor 33) erroneously determines noise as a detection signal Y4 (detection signal Y3), the detectors 2 and 3 may execute the acquisition processes almost at the same timing. In the position detection device 1 of the third embodiment, when the execution time period DP1 of the processor 23 and the execution time period DP1 of the processor 33 overlap each other in large part as described above, time periods during which excitation coils 21 and 31 operate also overlap each other in large part. Therefore, a change is less likely to be caused in the detection signal Y1 (detection signal Y2). Thus, in the above case, the position detection device 1 of the third embodiment may not be able to monitor whether or not the mutual interference occurs.

Therefore, to solve the problem described above, a processor 23 (first processor) and a processor 33 (second processor) in the position detection device 1 according to the present embodiment have the following configurations. That is, the (first) processor 23 is configured to drive a (first) excitation coil 21 a plurality of times in the (first) acquisition process. Similarly, the (second) processor 33 is configured to drive a (second) excitation coil 31 a plurality of times in the (second) acquisition process.

Figure 17A:
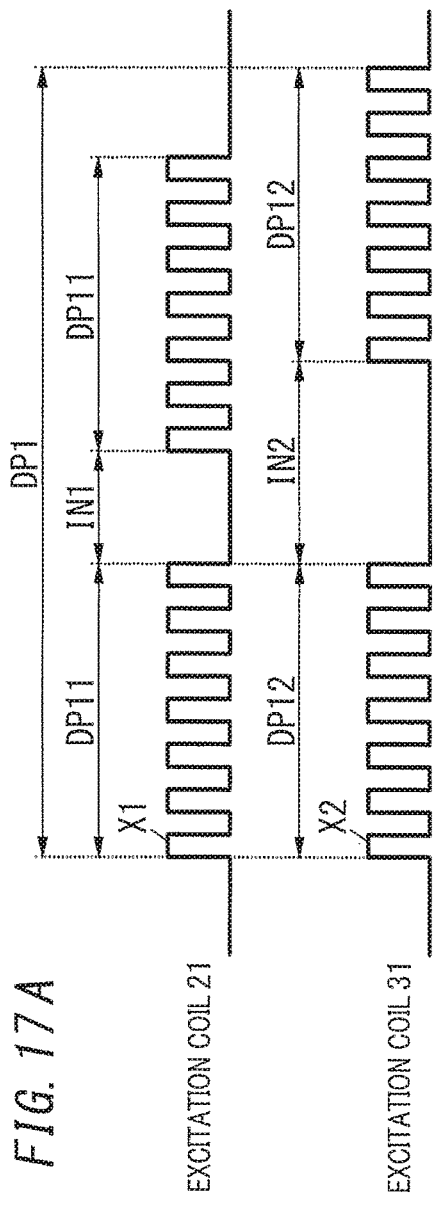
FIGS. 17A and 17B are waveform charts each illustrating drive signals in the position detection device according to the third embodiment in a case where a drive period of an excitation coil of each detector is divided into a plurality of periods.

For example, as illustrated in FIG. 17A, it is assumed that the (first) processor 23 drives the (first) excitation coil 21 two times at a first interval IN1 during an execution time period DP1. Similarly, it is assumed that the (second) processor 33 drives the (second) excitation coil 31 two times at second intervals IN2 during the execution time period DP1. It is assumed that the length of the first interval IN1 and the length of the second interval IN2 are different from each other. In the following description, a time period during which the (first) processor 23 drives the (first) excitation coil 21 is referred to as a "first drive period DP11," and a time period during which the (second) processor 33 drives the (second) excitation coil 31 is referred to as a "second drive period DP12."

In this case, during the execution time period DP1, a first-time first drive period DP11 and a first-time second drive period DP12 overlap each other in large part. However, a second-time first drive period DP11 and a second-time second drive period DP12 partly overlap each other, and therefore, a change is caused in a detection signal Y1 (detection signal Y2). Thus, the processor 23 (processor 33) can monitor mutual magnetic interference even when the execution time periods DP1 overlap each other in large part.

Figure 17B:
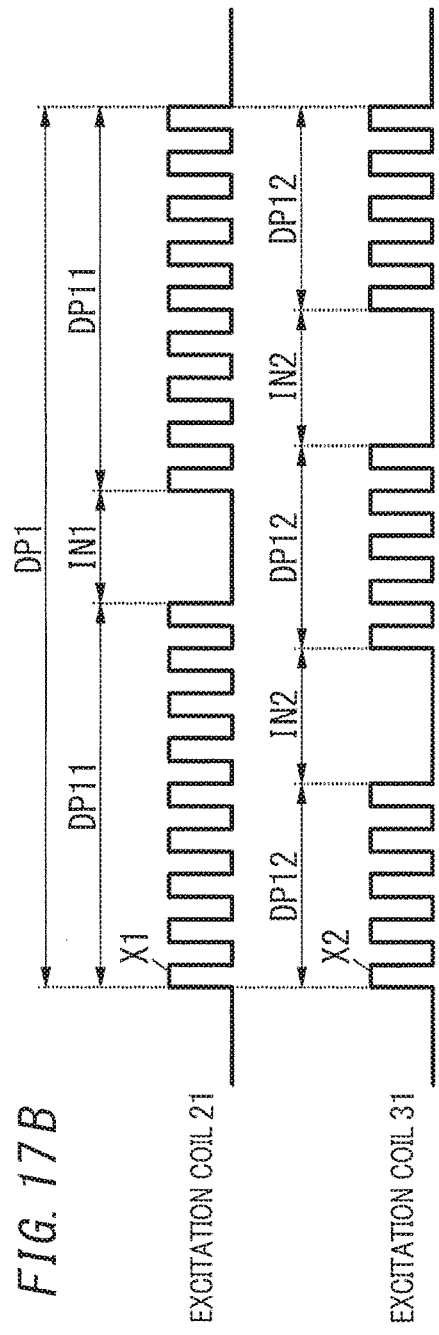

Alternatively, the processors 23 and 33 may be configured such that the number of times of driving the (first) excitation coil 21 and the number of times of driving the (second) excitation coil 31 are different from each other during the execution time period DP1. For example, as illustrated in FIG. 17B, it is assumed that the (first) processor 23 drives the (first) excitation coil 21 two times at the first interval IN1 during the execution time period DP1, whereas it is assumed that the (second) processor 33 drives the (second) excitation coil 31 three times at the second intervals IN2 during the execution time period DP1.

In this case, during the execution time period DP1, the first-time first drive period DP11 partly overlaps the first-time second drive period DP12 and the second-time second drive period DP12. The second-time first drive period DP11 partly overlaps the second-time second drive period DP12 and a third-time second drive period DP12. Therefore, since a change is caused in the detection signal Y1 (detection signal Y2) during the execution time period DP1, the processor 23 (processor 33) can monitor mutual magnetic interference.

Figure 18:
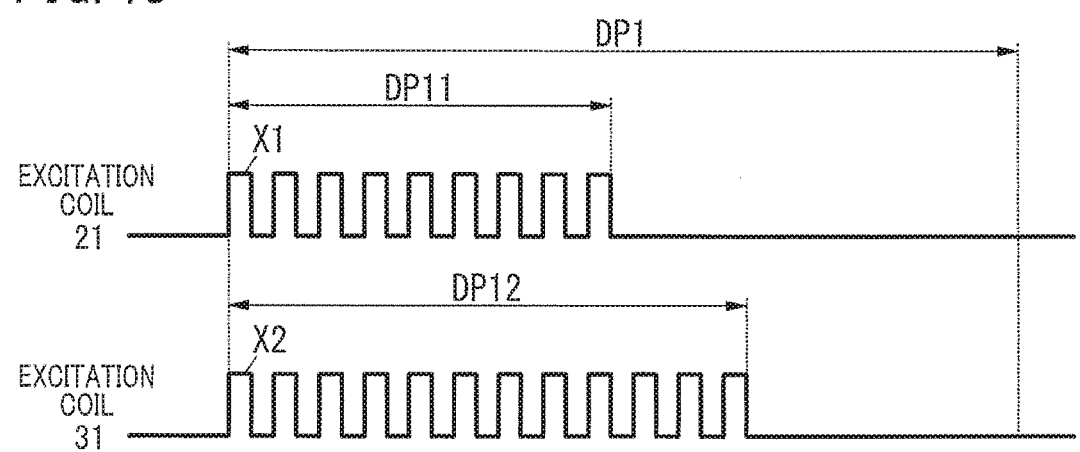
FIG. 18 is a waveform chart of drive signals in a position detection device according to a fourth embodiment in a case where drive periods of detectors differ from each other.

Alternatively or additionally, the processors 23 and 33 may be configured such that the length of the first drive period DP11 and the length of the second drive period DP12 are different from each other during the execution time period DP1. For example, as illustrated in FIG. 18, it is assumed that during the execution time period DP1, the second drive period DP12 is longer than the first drive period DP11. In this case, during the execution time period DP1, the first drive period DP11 ends before the end of the second drive period DP12 ends. Therefore, since a change is caused in a signal induced in the (first) detection coil 22 with the end of the first drive period DP11 as a border, the (first) processor 23 can monitor mutual magnetic interference. Similarly, since a change is caused in the detection signal Y2 with the end of the first drive period DP11 as a border, the (second) processor 33 can monitor mutual magnetic interference.

In the above description, the detector 2 is assumed to be a first detector and the detector 3 is assumed to be a second detector, but a similar effect may be obtained also when the detector 2 is assumed to be a second detector and the detector 3 is assumed to be a first detector. That is, the position detection device 1 of each embodiment may include two detectors 2 and 3, and one of the two detectors 2 and 3 may be configured as a first detector and the remaining one of the two detectors 2 and 3 may be configured as a second detector. That is, the detectors 2 and 3 have the same configuration and each serve as either a first detector or a second detector. Thus, even when a fault occurs on one of the detectors in the position detection device 1 of each embodiment, the remaining one of the detectors can execute the acquisition process.

While the position detection device 1 of each embodiment includes two detectors 2 and 3, the embodiment does not intend to limit the number of detectors. That is, the position detection device 1 of each embodiment may include three or more detectors. In this case, the position detection device 1 may be configured such that the processors of the detectors execute the acquisition processes in turn, and time periods during which the detectors perform the acquisition processes do not overlap each other.

As described above, the position detection device 1 of the present embodiment includes the following first feature.

According to the first feature, the position detection device 1 includes the detector 2 (here, a first detector) and the detector 3 (here, a second detector). The detector 2 includes the (first) excitation coil 21, the (first) detection coil 22, and the (first) processor 23. The detector 3 includes the (second) excitation coil 31, the (second) detection coil 32, and the (second) processor 33. The (first) excitation coil 21 is magnetically coupled to the (first) detection coil 22 and to the (second) detection coil 32. The (second) excitation coil 31 is magnetically coupled to the (first) detection coil 22 and to the (second) detection coil 32.

The (first) processor 23 is configured to intermittently execute a (first) acquisition process during a measurement period of the (first) processor 23. The (first) acquisition process is a process of driving the (first) excitation coil 21 and acquiring a (first) detection signal Y1 induced in the (first) detection coil 22 depending on the position of an object 100 by the driving the (first) excitation coil 21. The (second) processor 33 is configured to intermittently execute a (second) acquisition process during a measurement period of the (second) processor. The (second) acquisition process is a process of driving the (second) excitation coil 31 and acquiring a (second) detection signal Y2 induced in the (second) detection coil 32 depending on the position of the object 100 by the driving the (second) excitation coil 31.

The (second) processor 33 monitors whether or not the (first) processor 23 is executing the (first) acquisition process without driving the (second) excitation coil 31 during a monitoring period set before the measurement period of the (second) processor 33. The (second) processor 33 is configured to execute the predetermined process when the (first) processor 23 is executing the (first) acquisition process.

Moreover, in addition to the first feature, the position detection device 1 of the present embodiment may include the following second feature.

According to the second feature, the (first) processor 23 and the (second) processor 33 are electrically connected to each other via the communication line 5. The (second) processor 33 is configured to determine that the (first) processor 23 is executing the (first) acquisition process when a change is caused in a signal flowing through the communication line 5 during the monitoring period.

In addition to the first feature, the position detection device 1 of the present embodiment may include the following third feature.

According to the third feature, the (second) processor 33 is configured to determine that the (first) processor 23 is executing the (first) acquisition process when the signal (detection signal Y3) is induced in the (second) detection coil 32 during the monitoring period.

In addition to the third feature, the position detection device 1 of the present embodiment may include the following fourth feature.

According to the fourth feature, the (second) processor 33 executes the (second) acquisition process such that the time period of the (first) acquisition process is separated from the time period of the (second) acquisition process. More specifically, the (second) processor 33 is configured to execute the (second) acquisition process at a timing based on the (third) detection signal Y3 induced in the (second) detection coil 32 by driving the (first) excitation coil 21.

In addition to the fourth feature, the position detection device 1 of the present embodiment may include the following fifth feature.

According to the fifth feature, the (second) processor 33 has a function of measuring the amplitude of the (third) detection signal Y3. The (second) processor 33 is configured to determine a timing based on the amplitude having decreased below a predetermined threshold.

In addition to the fourth feature, the position detection device 1 of the present embodiment may include the following sixth feature.

According to the sixth feature, the (first) processor 23 has a function of giving an end signal notifying the end of the (first) acquisition process to the (first) excitation coil 21. The (second) processor 33 is configured to determine a timing based on the end signal having been induced in the (second) detection coil 32 and having been detected.

In addition to the fourth feature, the position detection device 1 of the present embodiment may include the following seventh feature.

According to the seventh feature, the (first) processor 23 is configured to stop operation of the (first) processor when the (first) detection signal Y1 is not detected in the (first) acquisition process.

In addition to the fourth feature, the position detection device 1 of the present embodiment may include the following eighth feature.

According to the eighth feature, the (second) processor 33 has a function of measuring the (second) standby time T2 when the (second) acquisition process ends. The (second) processor 33 is configured to execute the (second) acquisition process when the (third) detection signal Y3 is not detected within the (second) standby time T2.

In addition to the eighth feature, the position detection device 1 of the present embodiment may include the following ninth feature.

According to the ninth feature, the (first) processor 23 is configured to be switched to a mode different from the normal mode to execute the (first) acquisition process when the (fourth) detection signal Y4 is not detected within the (first) standby time T2.

In addition to the eighth feature, the position detection device 1 of the present embodiment may include the following tenth feature.

According to the tenth feature, the (first) processor 23 has a function of measuring the (first) standby time T2 when the (first) acquisition process ends. The (first) processor 23 is configured to execute the (first) acquisition process when the (first detection coil) is not detected by driving the (second) excitation coil 31.

In addition to the eighth feature, the position detection device 1 of the present embodiment has the following eleventh feature.

According to the eleventh feature, the (second) processor 33 has a function of measuring the determination time T3 when the (second) acquisition process ends. The (second) processor 33 is configured to stop operation of the (second) processor 33 when the (third) detection signal Y3 is detected within the determination time T3.

In addition to the second feature, the position detection device 1 of the present embodiment may include the following twelfth feature.

According to the twelfth feature, the predetermined process is a process in which a starting time point of the measurement period of the (second) processor 33 is adjusted not to overlap the (first) acquisition process.

In addition to the second feature, the position detection device 1 of the present embodiment may include the following thirteenth feature.

According to the thirteenth feature, the predetermined process is a process of stopping the operation of the (second) processor 33.

In addition to the second feature, the position detection device 1 of the present embodiment may further include the following fourteenth feature.

According to the fourteenth feature, the (second) processor 33 is configured to monitor whether or not a change is caused in the signal (detection signal Y2) induced in the (second) detection coil 32 while executing the (second) acquisition process. The (second) processor 33 is configured to execute the predetermined process when the change is caused in the signal (detection signal Y2).

In addition to the fourteenth feature, the position detection device 1 of the present embodiment may include the following fifteenth feature.

According to the fifteenth feature, the (first) processor 23 is configured to drive the (first) excitation coil 21 a plurality of times in the (first) acquisition process. The (second) processor 33 is configured to drive the (second) excitation coil 31 a plurality of times in the (second) acquisition process.

In addition to the fifteenth feature, the position detection device 1 of the present embodiment may include the following sixteenth feature.

According to the sixteenth feature, the (second) processor 33 drives the (second) excitation coil 31 by a drive signal X2 having a predetermined frequency. The (second) processor 33 is configured to acquire the signal (detection signal Y2) induced in the (second) detection coil 32 at a sampling period different from a period represented by using a natural number M as M/2 times the period of the drive signal X2 while executing the (second) acquisition process.

In addition to the sixteenth feature, the position detection device 1 of the present embodiment may include the following seventeenth feature.

According to the seventeenth feature, the predetermined process is a process of executing the (second) acquisition process not overlap the (first) acquisition process.

In addition to the sixteenth feature, the position detection device 1 of the present embodiment may include the following eighteenth feature.

According to the eighteenth feature, the predetermined process is a process of stopping the operation of the (second) processor 33.

The (second) processor 33 of the position detection device 1 of the present embodiment monitors whether or not the (first) processor 23 is executing the (first) acquisition process during the monitoring period before the measurement period is started, so that the position detection device 1 can execute the predetermined process depending on the result of the determination. This provides the effect that the position detection device 1 of the present embodiment can reduce the possibility that the (first) acquisition process and the (second) acquisition process are simultaneously executed on activation of the detectors 2 and 3, that is, the possibility that time periods during which the excitation coils 21 and 31 operate overlap each other.

The invention claimed is:

1. A position detection device, comprising:
a first detector and a second detector, wherein
the first detector includes a first excitation coil, a first detection coil, and a first processor,
the second detector includes a second excitation coil, a second detection coil, and a second processor,
the first excitation coil is magnetically coupled to the first detection coil and the second detection coil,
the second excitation coil is magnetically coupled to the first detection coil and the second detection coil,
the first processor is configured to intermittently execute a first acquisition process during a measurement period of the first processor to drive the first excitation coil and to acquire a first detection signal induced in the first detection coil depending on a position of an object by driving the first excitation coil,
the second processor is configured to intermittently execute a second acquisition process during a measurement period of the second processor to drive the second excitation coil and to acquire a second detection signal induced in the second detection coil depending on the position of the object by driving the second excitation coil, and
the second processor is configured to monitor whether or not the first processor is executing the first acquisition process without driving the second excitation coil in a monitoring period set before the measurement period of the second processor, and the second processor is configured to execute a predetermined process when the first processor is executing the first acquisition process.

2. The position detection device according to claim 1, wherein
the first processor and the second processor are electrically connected to each other via a communication line, and
the second processor is configured to determine that the first processor is executing the first acquisition process when a change is caused in a signal flowing through the communication line during the monitoring period.

3. The position detection device according to claim 2, wherein
the predetermined process is a process of adjusting a starting time point of the measurement period of the second processor not to overlap the first acquisition process.

4. The position detection device according to claim 2, wherein
the predetermined process is a process of stopping operation of the second processor.

5. The position detection device according to claim 2, wherein
the second processor is configured to monitor whether or not a change is caused in a signal induced in the second detection coil while executing the second acquisition process, and the second processor is configured to execute the predetermined process when the change is caused.

6. The position detection device according to claim 5, wherein
the first processor is configured to drive the first excitation coil a plurality of times in the first acquisition process, and
the second processor is configured to drive the second excitation coil a plurality of times in the second acquisition process.

7. The position detection device according to claim 6, wherein
the second processor drives the second excitation coil by a drive signal having a predetermined frequency, and
the second processor is configured to acquire the signal induced in the second detection coil in a sampling period different from a period represented by using a natural number M as M/2 times a period of the drive signal while executing the second acquisition process.

8. The position detection device according to claim 7, wherein
the predetermined process is a process of executing the second acquisition process not to overlap the first acquisition process.

9. The position detection device according to claim 7, wherein
the predetermined process is a process of stopping operation of the second processor.

10. The position detection device according to claim 1, wherein
the second processor is configured to determine that the first processor is executing the first acquisition process when a signal is induced in the second detection coil during the monitoring period.

11. The position detection device according to claim 10, wherein
the second processor is configured to executes the second acquisition process at a timing based on a third detection signal induced in the second detection coil by driving the first excitation coil such that a time period of the first acquisition process is separated from a time period of the second acquisition process.

12. The position detection device according to claim 11, wherein
the second processor has a function of measuring an amplitude of the third detection signal, and
the second processor is configured to determine the timing based on the amplitude having decreased below a predetermined threshold.

13. The position detection device according to claim 11, wherein
the first processor has a function of giving an end signal notifying that the first acquisition process ends to the first excitation coil, and
the second processor is configured to determine the timing based on the end signal having been induced in the second detection coil and having been detected.

14. The position detection device according to claim 11, wherein
the first processor is configured to stop operation of the first processor when the first detection signal is not detected in the first acquisition process.

15. The position detection device according to claim 11, wherein
the second processor has a function of measuring a second standby time when the second acquisition process ends, and
the second processor is configured to execute the second acquisition process when the third detection signal is not detected within the second standby time.

16. The position detection device according to claim 15, wherein
the second processor is configured to be switched to a mode different from a normal mode to execute the second acquisition process when the third detection signal is not detected within the second standby time.

17. The position detection device according to claim 15, wherein
the first processor has a function of measuring a first standby time when the first acquisition process ends,
the first processor is configured to execute the first acquisition process when a fourth detection signal induced in the first detection coil by driving the second excitation coil is not detected within the first standby time, and
the first standby time has a length different from a length of the second standby time.

18. The position detection device according to claim 15, wherein
the second processor has a function of measuring a determination time when the second acquisition process ends, and
the second processor is configured to stop operation of the second processor when the third detection signal is detected within the determination time.

\* \* \* \* \*